United States Patent
Ito et al.

(10) Patent No.: US 9,128,847 B2
(45) Date of Patent: Sep. 8, 2015

(54) CACHE CONTROL APPARATUS AND CACHE CONTROL METHOD

(71) Applicant: Hitachi, Ltd., Tokyo (JP)

(72) Inventors: Yuji Ito, Yokohama (JP); Junji Ogawa, Sagamihara (JP); Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 13/695,754

(22) PCT Filed: Oct. 18, 2012

(86) PCT No.: PCT/JP2012/006676
§ 371 (c)(1),
(2) Date: Nov. 1, 2012

(87) PCT Pub. No.: WO2014/061064
PCT Pub. Date: Apr. 24, 2014

(65) Prior Publication Data
US 2014/0115235 A1  Apr. 24, 2014

(51) Int. Cl.
*G06F 3/0484* (2013.01)
*G06F 7/48* (2006.01)
*G06F 7/64* (2006.01)
*G06F 12/08* (2006.01)
*G06F 12/02* (2006.01)

(52) U.S. Cl.
CPC ........ *G06F 12/0811* (2013.01); *G06F 12/0246* (2013.01); *G06F 12/0868* (2013.01); *G06F 12/0897* (2013.01); *G06F 2212/225* (2013.01); *G06F 2212/7208* (2013.01)

(58) Field of Classification Search
CPC ............ G06F 12/0866; G06F 11/1076; G06F 12/0804; G06F 11/3485; G06F 12/0868; G06F 2221/1009; G06F 2212/282; G06F 12/0897; G06F 12/0848; G06F 12/0871; G06F 2212/225; G06F 3/068
See application file for complete search history.

(56) References Cited

U.S. PATENT DOCUMENTS

| | | |
|---|---|---|
| 8,788,758 B1 * | 7/2014 | de la Iglesia .................. 711/136 |
| 2008/0126678 A1 * | 5/2008 | Mizushima .................... 711/103 |
| 2008/0222359 A1 | 9/2008 | Ninomiya et al. |
| 2009/0138654 A1 * | 5/2009 | Sutardja ......................... 711/103 |
| 2012/0054421 A1 * | 3/2012 | Hiratsuka et al. ............. 711/103 |
| 2013/0024624 A1 * | 1/2013 | Benhase et al. ............... 711/136 |
| 2014/0101370 A1 * | 4/2014 | Chu et al. ...................... 711/103 |

* cited by examiner

*Primary Examiner* — Cheng-Yuan Tseng
*Assistant Examiner* — Candice Rankin
(74) *Attorney, Agent, or Firm* — Foley & Lardner LLP

(57) ABSTRACT

A cache control apparatus comprises a primary cache part, a secondary cache part for caching data destaged from the primary cache part, and a controller connected to the primary cache part and to the secondary cache part. The secondary cache part has a first storage part and a second storage part having a lifetime longer than that of the first storage part. The controller determines whether the data destaged from the primary cache part is to be stored in the first storage part or the second storage part in the secondary cache part, based on a use state indicating whether or not the data has been updated, and stores the data in the first storage part or the second storage part determined.

11 Claims, 26 Drawing Sheets

Storage controller
Cache management table — 1000

| Cache segment ID | LBA | Cache size | Storage place | Cache status | Access pattern | Recently used time | Read Count |
|---|---|---|---|---|---|---|---|
| 0 | B45F24h | 8KB | DRAM | dirty | sequential | FEDCB | 123 |
| 876543 | A4542Bh | 16KB | SSD | clean (writeback) | random | A987654 | 456 |
| FEDCBA | 987810h | 16KB | SSD | clean (staging) | random | 54321FE | 78 |
| ... | ... | ... | ... | ... | ... | ... | ... |

SSD controller
SSD cache management table 2000

| Cache segment ID 2001 | LBA 2002 | physical address 2003 | Cache size 2004 | Cache status 2005 | Recently used time 2006 | Read Count 2007 |
|---|---|---|---|---|---|---|
| 5 | B45F50h | 143FA (SCM) | 1 KB | dirty | FEDCB | 123 |
| 215 | A4592Bh | 13920 (SCM) | 2KB | clean (writeback) | A987654 | 456 |
| 1248 | 1234450h | B12345 (MLC) | 8 KB | clean (staging) | 54321FE | 78 |
| 2364 | B45F48h | E92830 (MLC) | 8 KB | clean (staging) | FEDCB | 345 |
| ... | ... | ... | ... | ... | ... | ... |

Fig. 24

CACHE CONTROL APPARATUS AND CACHE CONTROL METHOD

TECHNICAL FIELD

The present invention relates to cache control on a storage system.

BACKGROUND ART

In recent years, SSDs (Solid State Drives) using a semiconductor device as a storage medium have been increasingly used in storage systems. SSDs are superior in random access performance to conventional HDDs. Schemes to develop SSDs larger in capacity and lower in price as SSDs using NAND flash memories in particular have progressed and the replacement of HDDs with such SSDs is now in progress. SCMs (Storage Class Memories) as a nonvolatile storage medium are smaller in capacity and higher in price than NAND flash memories but have higher access speeds and can be rewritten a larger number of times and are, therefore, attracting attention as a high-performance long-life recording medium. SCMs are a kind of nonvolatile semiconductor memory, e.g., an MRAM (Magnetic Random Access Memory), a PRAM (Phase Change Random Access Memory) and a ReRAM (Resistance Random Access Memory).

The system performance of a storage system is improved by utilizing unevenness of the frequency of access to data and by providing a storage controller with a cache using a high-speed storage medium. This is because a large overhead occurs if all possible accesses to an HDD that is a final storage place for data are made. If data frequently accessed is stored in a cache, an access can be made at a high speed to the data without accessing the HDD when the data is again accessed. Accordingly, if the cache capacity is increased, the amount of data accessible at a high speed is increased. That is, the rate of hitting data in the cache is improved and an improvement in the system performance can be expected.

DRAMs are being widely used as caches in storage systems. DRAMs are much higher in speed than HDDs but have problems in terms of increasing the capacity and in terms of price. In recent years, techniques using an SSD having lower in price and having a characteristic of a larger capacity in comparison with DRAMs as a cache in a storage system have been disclosed. An SSD using NAND flash memories lower in price and having a large capacity in comparison with DRAMs is used as a secondary cache in a storage system to increase the cache hit rate and improve the system performance and the cost performance.

CITATION LIST

Patent Literature

[PTL 1] United States Patent Application Publication 2008/0222359

SUMMARY OF INVENTION

Technical Problem

In a flash memory, low-priced and having a large capacity, there is a limit on the number of times data can be erased. Further, in a flash memory, overwrite with data at the same physical address cannot be performed. There is a need to first perform erasing by a unit amount (block) larger than a unit read/write amount (page) before writing. Performing erasing for each overwrite means an increase in overhead and wasting of the limited number of times erasing is performed. In an SSD using a flash memory, therefore, a capacity larger than a capacity recognizable by a user are prepared, and an update processing is performed by securing an update area for data with which an overwrite is to be performed, and by associating a logical address in a logical area recognizable by the user and an actual physical address with each other. For example, when data with a physical address P assigned with respect to a logical address L is updated, a physical address P' is newly assigned to the logical address L, the data is written to a corresponding physical page, and the data at the physical address P is invalidated. Thereafter, when the remaining capacity of the flash memory becomes insufficient, a need arises to erase the invalidated data in order to newly secure a writable area. That is, making writes leads to consumption of the lifetime of the SSD.

With respect to a cache in a storage system, read of data to the cache is called staging and expelling of data from the cache is called destaging. The data erase count in a storage medium used as a cache in a storage system is markedly increased due to staging and destaging of cache data relative to that in an ordinary final storage device (a storage device in which data is finally managed). This is for the reason that since in a cache having a small capacity in comparison with the capacity of the entire system, inputs and outputs to be processed by many final storage devices are processed by a small number of storage mediums for use as the cache, the load per storage medium is increased and the frequency of updating is increased. Also, even during read processing, write processing for storing read target data is performed on the storage mediums for use as the cache when staging is performed. Rewrite is performed even when only access for read is made. This leads to reducing the number of times erasing can be performed. The lifetime of a NAND flash memory of an MLC (Multi Level Cell) type in particular is largely reduced in a case where the memory is used as a cache relative to that in a case where the memory is used as a final storage device, since the number of times data can be erased in the memory is limited. On the other hand, it is difficult to increase the cache capacity in the case of a flash memory of an SLC (Single Level Cell) type, a SCM or the like having a lifetime longer than that of the MLC-type NAND flash memory, since the price per unit capacity of such a type of memory is high as described above. Therefore such a type of memory is not effective in improving the system performance.

Solution to Problem

A cache control apparatus comprises a primary cache part, a secondary cache part for caching data destaged from the primary cache part, and a controller connected to the primary cache part and to the secondary cache part. The secondary cache part has a first storage part and a second storage part having a lifetime longer than that of the first storage part. The controller determines whether the data destaged from the primary cache part is to be stored in the first storage part or the second storage part in the secondary cache part, based on a use state indicating whether or not the data has been updated, and stores the data in the first storage part or the second storage part determined.

Advantageous Effects of Invention

Data that has been updated and that is assumed to be updated with a high update frequency can be cached in the storage part having a longer lifetime, while data that has not been updated and that is assumed to be updated with a low update frequency, e.g., data mainly to be read can be cached in the storage part having a shorter lifetime, thus effectively limiting the degradation of the storage part having a shorter lifetime.

BRIEF DESCRIPTION OF DRAWINGS

FIG. 4 is a diagram showing an example of a cache management table according to Embodiment 1.

FIG. 24 is a diagram showing an example of an SSD cache management table according to Embodiment 5.

DESCRIPTION OF EMBODIMENTS

Several embodiments will be described below. The embodiments described below are not limiting of the present invention as set forth in the claims, and all the components and combinations of the components described in the description of the embodiments are not necessarily indispensable to the means for solution according to the present invention.

In the following description, in some cases, various sorts of information are described by using an expression "aaa table". Various sorts of information, however, may be expressed in a data structure different from a table. In some cases, "aaa table" is referred to as "aaa information" to indicate that the information is independent of the data structure.

Embodiment 1

Figure 1:
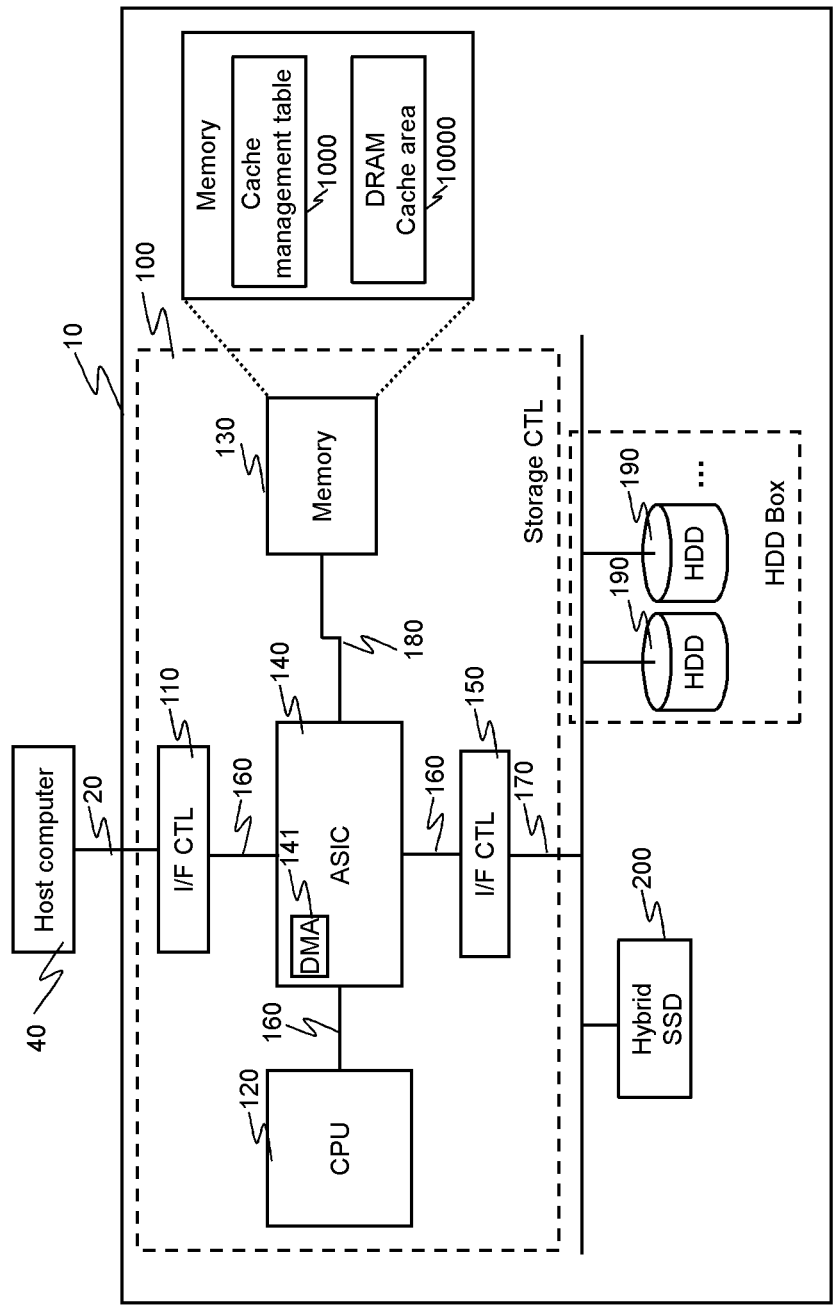
FIG. 1 is a diagram of the configuration of an example of a storage system according to Embodiment 1.

FIG. 1 is a diagram of the configuration of an example of a storage system according to Embodiment 1.

The storage system comprises a storage apparatus 10, which is an example of the cache control apparatus, and a host computer 40. The storage apparatus 10 and the host computer 40 are connected to each other through a network 20 such as a SAN (Storage Area Network) or a LAN (Local Area Network). The host computer 40 is, for example, a general-purpose computer. The host computer 40 executes a predetermined operational processing by reading out data stored in the storage apparatus 10 and storing data in the storage apparatus 10.

The storage apparatus 10 includes a storage controller 100, which is an example of a first controller, a hybrid SSD 200, which is an example of the cache control apparatus, and at least one HDD 190. The HDD 190 is used as a final storage device in which data is finally stored. The storage controller 100 is connected to the hybrid SSD 200 and to the HDD 190 via a bus 170.

The storage controller 100 includes an interface controller (I/F CTL) 110, a CPU 120, a memory 130, an interface controller (I/F CTL) 150, and an ASIC 140. The I/F CTL 110, the CPU 120, the memory 130, and the I/F CTL 150 are connected to the ASIC 140 via buses including a special-purpose internal bus 160 such as a PCI, and a memory bus 180. The I/F CTL 110 is a device for performing communication via the network 20. The I/F CTL 150 is a device for performing communication with the hybrid SSD 200 and the HDD 190 via the internal bus 170.

The CPU 120 executes various sorts of processing for performing operation controls on the entire storage apparatus 10. The memory 130 comprises a DRAM, for example, and stores a control program executed by the CPU 120, and control data. The memory 130 also stores a cache management table 1000 (see FIG. 4). The memory 130 has a DRAM cache area 10000 used as a primary cache to which data to be written to the HDD 190 or data read from the HDD 190 is temporarily cached. Data temporarily cached will be referred to as cache data.

The ASIC 140 has a DMA (Direct Memory Access) part 141 that transfers data stored in the memory 130 without transferring the data via the CPU 120.

The hybrid SSD 200 is used as a secondary cache for caching data destaged from the memory 130.

In the present embodiment, a cache in the storage apparatus 10 is formed of the primary cache and the secondary cache in a two-hierarchical-level structure. Data to be read or written by the host computer 40 is first stored in the primary cache. The secondary cache is a cache for storing data destaged from the primary cache. The storage apparatus 10 reads from the secondary cache data that does not exist in the primary cache but exists in the secondary cache. A cache area used as a primary cache and existing in the memory 130 using a DRAM or the like will be referred to as "DRAM cache" (primary cache part), and the hybrid SSD 200 used as a secondary cache will be referred to as "SSD cache" (secondary cache part).

In the storage apparatus 10, data is first stored in the DRAM cache which is a primary cache, and data destaged from the DRAM cache is stored in the SSD cache.

By using the cache management table 1000, the storage controller 100 manages a storage area on an MLC FM chip 2012 (see FIG. 2) having a large capacity and a short lifetime in the hybrid SSD 200 used as a secondary cache.

Figure 2:
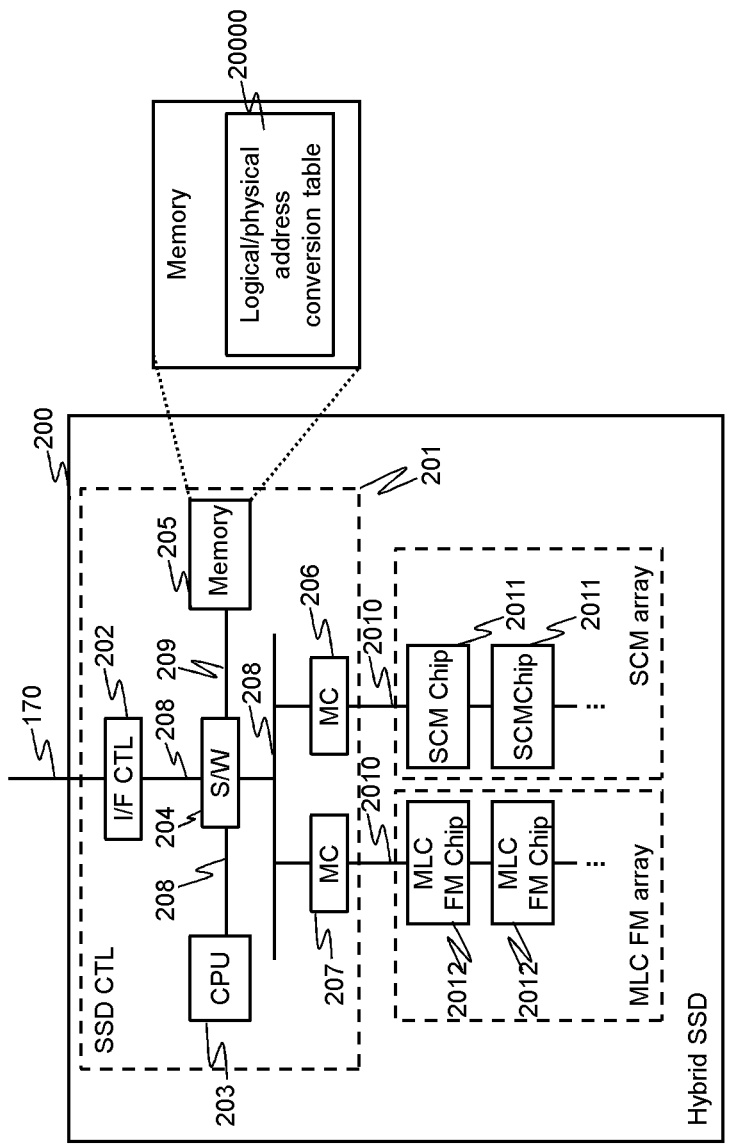
FIG. 2 is a diagram of the configuration of an example of a hybrid SSD according to Embodiment 1.

FIG. 2 shows the configuration of an example of the hybrid SSD according to Embodiment 1.

The hybrid SSD 200 comprises at least one SCM chip 2011 and at least one MLC FM chip 2012 as a nonvolatile storage medium. The SCM chip 2011 is an example of a storage device (long-life device: an example of the second storage part) having a smaller capacity but having a longer lifetime in comparison with the MLC FM chip 2012. The MLC FM chip 2012 is an example a storage device (short-life device: an example of the first storage part) having a larger capacity but having a shorter lifetime in comparison with the SCM chip 2011.

The hybrid SSD 200 further comprises an SSD controller (SSD CTL) 201, which is an example of a second controller that controls I/O requests from the storage controller 100. The SSD controller 201 includes an interface controller (I/F CTL) 202, a CPU 203, a memory 205, and memory controllers (MCs) 206 and 207. The I/F CTL 202, the CPU 203, the memory 205, and the MCs 206 and 207 are connected to each other via an internal bus 208 or a memory bus 209 and a switch 204. The MC 206 is connected to the SCM chip 2011 via a bus 2010. The MC 207 is connected to the MLC FM chip 2012 via the bus 2010.

The I/F CTL 202 is a device for connecting to the storage controller 100. The CPU 203 controls processes in the entire hybrid SSD 200. The memory 205 stores a control program executed by the CPU 203, control data, and a logical/physical address conversion table 20000 (see FIG. 3). The MC 206 controls the SCM chip 2011. The MC 207 controls the MLC FM chip 2012.

Figure 3:
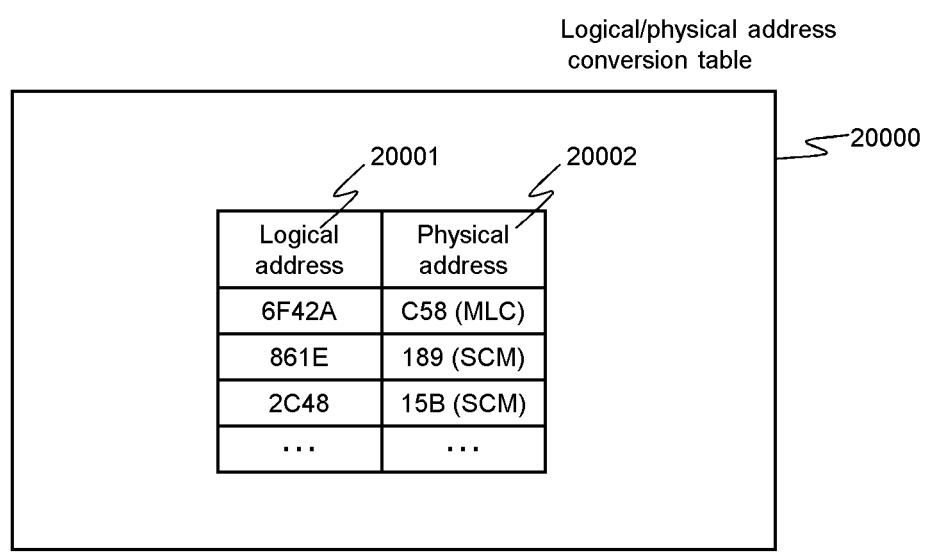
FIG. 3 is a diagram showing an example of a logical/physical address conversion table according to Embodiment 1.

FIG. 3 is a diagram showing an example of the logical/physical address conversion table according to Embodiment 1.

The logical/physical address conversion table 20000 is a table for conversion between logical addresses and physical addresses in the hybrid SSD 200. In general, in the SSD, a physical address on the nonvolatile storage medium in the SSD 200 is assigned to a logical address received from a higher-level controller (storage controller 10 in the present embodiment). For example, in a flash memory, overwrite with data at the same physical address cannot be performed unless a unit area (block) larger than a unit read/write area (page) is erased. At the time of updating data in a flash memory, therefore, a physical address different from a physical address already assigned is assigned as a physical address associated with the logical address for the data to be updated, and the data to be updated is written to the physical area corresponding to the newly assigned physical address. In the logical/physical address conversion table 20000, such associations between logical addresses and physical addresses are managed.

In the logical/physical address conversion table 20000, entries including fields of logical address 20001 and physical address 20002 are managed. A logical address designated from the higher-level side is stored in logical address 20001. A physical address in the physical area in the hybrid SSD 200 corresponding to the logical address stored in logical address 20001 in the same entry is stored in physical address 20002. In the hybrid SSD 200, physical addresses are managed by being divided with respect to the SCM chip 2011 and the MLC FM chip 2012. Therefore, it is possible to grasp, based on a physical address, whether the physical area corresponding to the physical address is a physical area in the SCM chip 2011 or a physical area in the MLC FM chip 2012. For convenience sake, "(MLC)" and "(SCM)" are added in physical address 20002 in FIG. 3 to indicate which physical area each physical address designates. "(MLC)" are "(SCM)" are not stored in the actual table.

FIG. 4 is a diagram showing an example of the cache management table in Embodiment 1.

The cache management table 1000 is stored in the memory 130 in the storage controller 100. The cache management table 1000 is management information for managing cache data managed in the DRAM cache and the SSD cache. The storage controller 100 manages cache data in units called segments (cache segments).

In the cache management table 1000, management with respect to each of the cache segments in the DRAM cache and the SSD cache is performed by means of an entry including fields of cache segment ID 1001, LBA 1002, cache size 1003, storage place 1004, cache status 1005, access pattern 1006, recently used time 1007, and read count 1008. In the present embodiment, the total number of cache segments with respect to the SSD cache corresponds to the number of areas provided as a cache in the MLC FM chips 2012 in the hybrid SSD 200.

In cache segment ID 1001, an identifier (cache segment ID) for identification of a cache management unit is stored. In the case of an entry corresponding to one of the cache segments in the SSD cache, a cache segment ID stored in cache segment ID 1001 is a logical address in the SSD cache. In LBA 1002, a logical address (LBA) for cache data assigned to the cache segment designated by the cache segment ID in cache segment ID 1001 in the same entry is stored. In cache size 1003, the size of valid data in the cache segment designated by the cache segment ID in cache segment ID 1001 in the same entry is stored.

In storage place 1004, information indicating a storage place device in which cache data is cached is stored. In the present embodiment, "DRAM" is set in storage place 1004 in a case where cache data is stored in the memory 130, and "SSD" is set in storage place 1004 in a case where cache data is stored in the hybrid SSD 200. Determination as to the existence/nonexistence of cache data in the DRAM cache or the SSD cache (i.e., hit/miss determination) can be made based on the values in cache segment ID 1001 and storage place 1004 of the entry found by search with the LBA for access target data used as a key.

In cache status 1005, information (use state information) indicating the state (of use) of the data stored in the cache segment corresponding to the cache segment ID in cache segment ID 1001 in the same entry is stored. A state in which data in one of the cache segments is equal to data stored in the HDD 190 is called "clean", and a state in which data in one of the cache segments is up-to-date relative to data stored in the HDD 190 is called "dirty". More specifically, the state of data in one of the cache segments when the data is read from the HDD 190 to the cache segment by processing for reading out data from the HDD 190 to the cache (staging processing) is "clean", and the state of data in the cache segment as a result of thereafter performing write (updating) on the same data (the data in that cache segment) so that only the data in the cache segment is updated is "dirty". Also, the state of data in the cache segment after destaging the dirty data to the HDD 190 so that the data in the cache segment and the data stored in the HDD 190 are identical to each other is "clean". In the present embodiment, for determination of a storage place in the SSD cache described below with reference to FIG. 14, the "clean" state of data in the cache segments is further divided into two discriminable states. More specifically, based on determination as to whether writeback, which is processing for writing back data to the HDD 190, has been performed after staging the data to the cache and updating the data, the state of data updated and written back is identified as "clean (writeback)", and the state of data not updated is identified as "clean (staging)". In the present embodiment, data in the "clean (writeback)" state is treated as data with a higher update frequency in comparison with data in the "clean (staging)" state because it is data having undergone updating at least one time after being read to the cache. Accordingly, cache data in the state shown by "dirty" or "clean (writeback)" in cache status 1005 is treated as data with a higher update frequency, since it is data having undergone updating at least one time after being read to the cache. Also, in the present embodiment, when no cache data is assigned to the cache segment corresponding to the cache segment ID in cache segment ID 1001 in the same entry, "free" indicating that the cache segment is free space is stored in cache status 1005. By storing "free" in cache status 1005 in the cache management table 1000, free spaces in the cache are managed. However, management of free spaces in the cache is not limited to this. Free spaces in the cache may be determined by computation.

In access pattern 1006, a pattern of access to cache data is stored. An access pattern is information indicating, for example, whether sequential access or random access is made to cache data. An access pattern in access pattern 1006 is used, for example, in determination described below as to whether or not caching to the SSD cache is required (S43 in FIG. 6). In recently used time 1007, the recent time when access was made to cache data (recently used time) is stored. The recently used time in recently used time 1007 is used in selecting data to be destaged from cache storage places. In read count 1008, the number of times cache data has been read (read count) is stored. The read count is used, for example, in determination as to whether or not cache data is to be migrated from the SCM chip 2011 to the MLC FM chip 2012 (S4415 in FIG. 10).

While the cache status is managed on the cache segment basis in the cache management table shown in FIG. 4, the cache status may be managed with respect to unit amounts smaller than the cache segment. In a case where the cache status is managed with respect to such smaller unit amounts, a storage place (SCM chip 2011 or MLC FM chip 2012) in the SSD cache may be determined with respect to each unit amount on which cache status management is performed.

Figure 5:
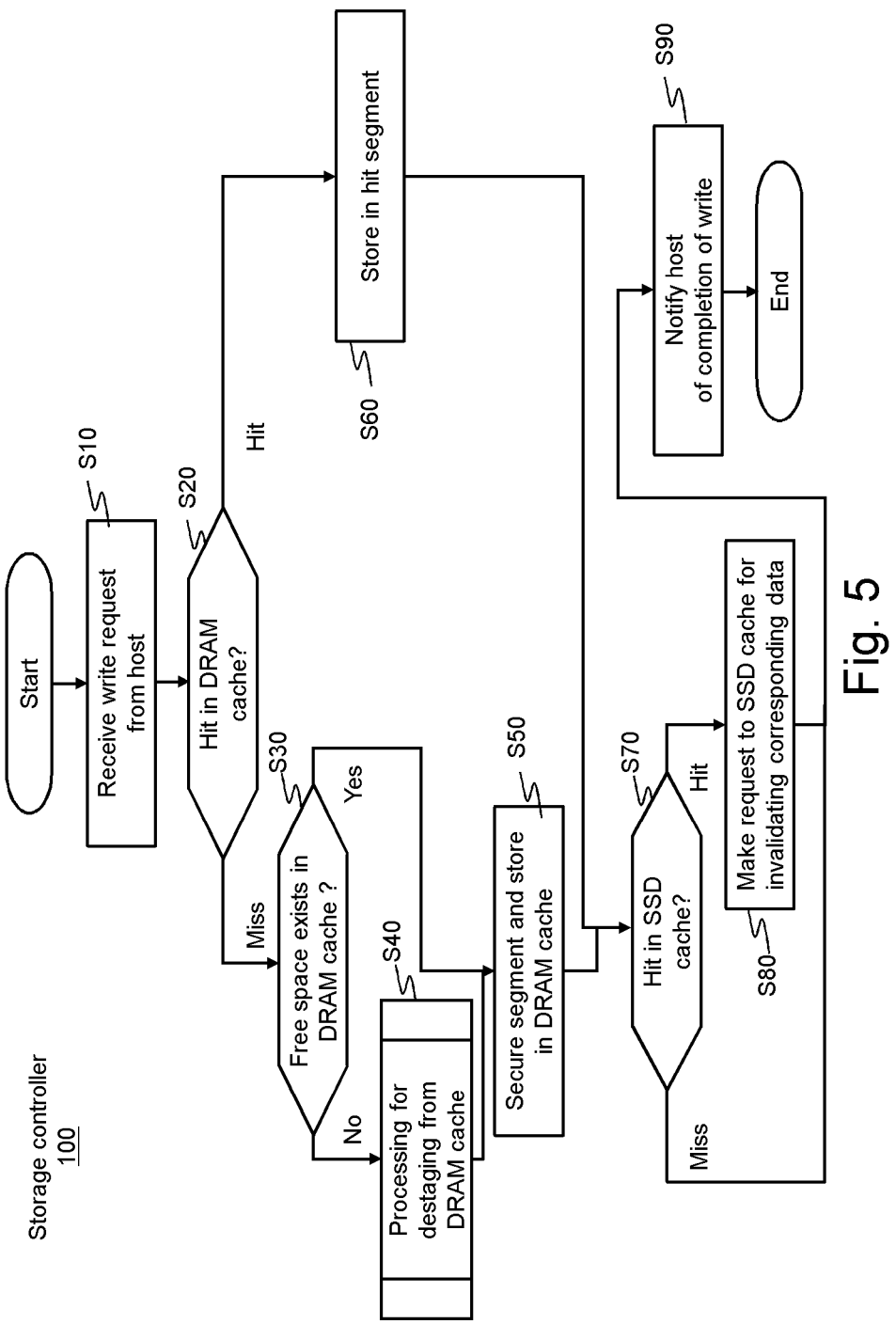
FIG. 5 is a flowchart of a write process with a storage controller according to Embodiment 1.

FIG. 5 is a flowchart of a write process with the storage controller according to Embodiment 1.

The write process is a process in which the storage controller 100 receives a write request from the host computer 40 and caches write target data onto the DRAM cache.

Receiving a write request from the host computer 40 (S10), the storage controller 100 checks the data designated by the write request through the cache management table 1000, and more specifically, checks whether the data corresponding to the LBA (Logical Block Address) in the write request is stored in the DRAM cache (Hit) or not stored in the DRAM cache (Miss) (S20). In the case of a miss in the DRAM cache (S20: Miss), the storage controller 100 checks through the cache management table 1000 whether or not any free space (free segment) exist in the DRAM cache (S30). If a free space does not exist (S30: No), the storage controller 100 performs processing for destaging (see FIG. 6) from the DRAM cache to destage cache data from the DRAM cache (S40), thereby securing an free space in the DRAM cache.

After securing an free space in the DRAM cache, or if there is a free space in the DRAM cache (S30: Yes), the storage controller 100 newly secure one of the cache segments, stores the write target data in the secured cache segment (S50) and advances the process to step S70.

On the other hand, in the case of a hit in the DRAM cache (S20: Hit), the storage controller 100 stores the write target data in the hit cache segment (S60) and advances the process to step S70.

In step S70, the storage controller 100 checks through the cache management table 1000 whether or not the data corresponding to the LBA in the write request is hit in the SSD cache (S70). In the case of a hit in the SSD cache (S70: Hit), the storage controller 100 makes a request to the SSD cache (more specifically, the hybrid SSD 200) for invalidating the data (S80), notifies the host computer 40 of the completion of write (S90) and ends the write process. Thus, the data before updating on the SSD cache is invalidated to secure consistency in the data on cache. Also, an improvement in capacity efficiency of the SSD cache can be achieved in this way.

On the other hand, in the case of a miss in the SSD cache (S70: Miss), the storage controller 100 notifies the host computer 40 of the completion of write and ends the write process.

Processing for invalidating the data on the SSD cache (S70, S80) may be performed after notifying the host computer 40 of the completion of write (S90).

Figure 6:
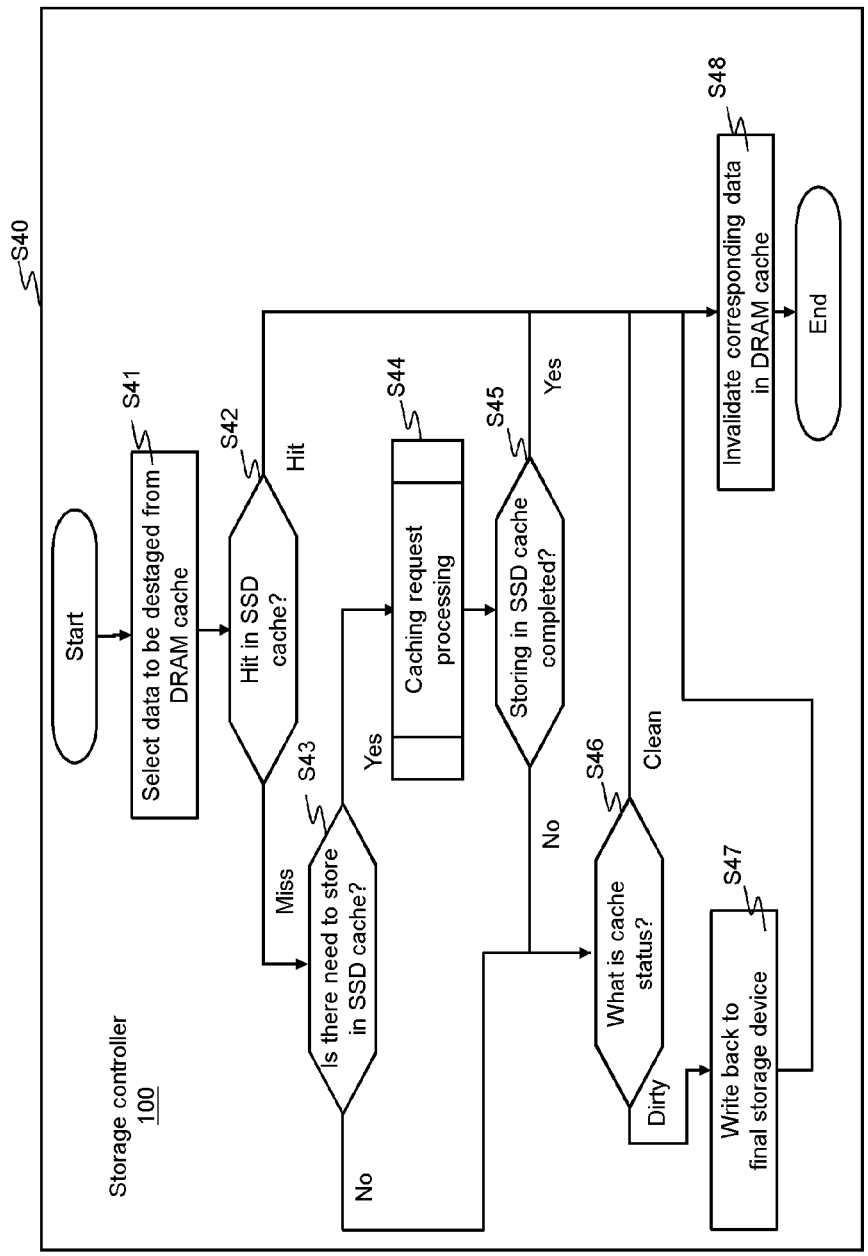
FIG. 6 is a flowchart of a process of destaging from a DRAM according to Embodiment 1.

FIG. 6 is a flowchart of a process of destaging from the DRAM according to Embodiment 1.

The process of destaging from the DRAM is a process in which the storage controller 100 destages cache data from the DRAM cache, and which corresponds to step S40 in FIG. 5.

The storage controller 100 selects data to be destaged from the DRAM cache by using the cache management table 1000 (S41). An example of a method of selecting data to be destaged is a method of selecting by using the value of recently used time 1007 in the cache management table 1000 and by using a cache algorithm such as LRU (Least Recently Used) or FIFO (First in First out). The selected data is referred to as "target data" in the description made with reference to FIG. 6.

Next, the storage controller 100 checks through the cache management table 1000 whether or not the target data is also hit in the SSD cache (S42). In the case of a hit in the SSD cache (S42: Hit), the storage controller 100 invalidates the data on the DRAM cache (S48) and ends the process of destaging from the DRAM, because the hit in the SSD cache signifies that the SSD cached data has not been updated since cache data in the SSD cache corresponding to data updated on the DRAM cache is invalidated as the data before updating (S80 in FIG. 5).

On the other hand, in the case of a miss in the SSD cache (S42: Miss), the storage controller 100 determines whether or not there is a need to store the target data in the SSD cache (S43). In the present embodiment, the storage controller 100 determines whether or not there is a need to store the target data in the cache based on the access pattern with respect to the target data. For example, if the target data is data sequentially accessed and has a size (larger size) larger than a predetermined size, the storage controller 100 determines that there is no need to store the data in the SSD cache, since the data occupies a storage area in the SSD cache, and since the advantage of storing in the SSD cache capable of random access at a higher speed in comparison with the HDD 190 is small. If the target data is small-size data or data randomly accessed, the storage controller 100 determines that there is a need to store the target data in the SSD cache, since the advantage of storing in the SSD cache capable of random access at a higher speed in comparison with the HDD 190 is large. More specifically, the storage controller 100 checks the need/no need for SSD caching of the target data based on the access pattern in access pattern 1006 in the cache management table 1000. The storage controller 100 may determine that there is no need to store the data in the SSD cache in the case of sequential access, and may determine that there is no need to store the data in the SSD cache if the size of the data is larger than the predetermined size. That is, the storage controller 100 may determine whether or not the data is to be stored in the SSD cache based on at least one of the data size and the access pattern.

If the result of the above-described determination is that there is a need for storing in the SSD cache (S43: Yes), the storage controller 100 executes a caching request process (See FIG. 7) to make a request to the SSD cache for caching the data, and advances the process to step S45. In the case of determining that there is no need for storing in the SSD cache (S43: No), the storage controller 100 advances the process to step S46.

In step S45, the storage controller 100 checks whether or not the target data has been cached in the SSD cache. The storage controller 100 makes this check as to whether or not the target data has been cached to the SSD cache through a reply command 4000 (see FIG. 8) sent from the SSD controller 201 in response to a caching request command. A state where storing in the SSD cache cannot be performed occurs, for example, in a situation where the SSD cache is incapable of writing after the end of its lifetime or in a situation where write to the SSD cache is impossible due to some cause.

In the case of determining that there is no need for storing in the SSD cache (S43: No) or in the case of failure to store in the SSD cache (S45: No), the storage controller 100 checks the cache status in the entry about the target data in the cache management table 1000 (S46). If as a result of this check the checked cache status is "dirty", that is, the target data is data (dirty data) obtained by updating the data from the HDD 190 (S46: Dirty), the storage controller 100 writes back the target data to the HDD 190, which is the final storage device (S47), and advances the process to step S48.

On the other hand, in the case of success in storing in the SSD cache (S45: Yes) or if the cache status is "clean", that is, an update is reflected in the data in the HDD 190 (S46: Clean), or when the target data is written back in step S47 (S47), the storage controller 100 invalidates the target data on the DRAM cache (S48) and ends the process of destaging from the DRAM.

Figure 7:
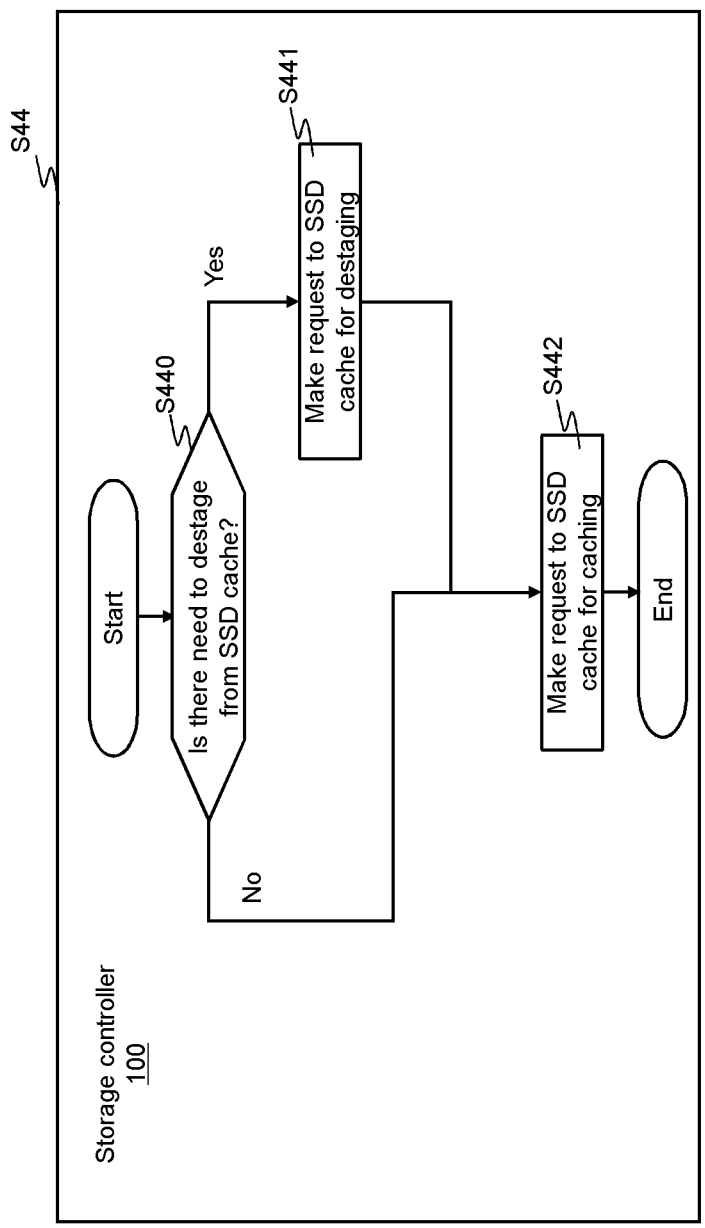
FIG. 7 is a flowchart of a process of making a request to an SSD cache for caching according to Embodiment 1.

FIG. 7 is a flowchart of a process of making a request to the SSD cache for caching according to Embodiment 1.

The caching request process is a process in which the storage controller 100 makes a request to the SSD cache for caching, and which corresponds to step S44 in FIG. 6.

The storage controller 100 checks whether there is a free space in the SSD cache by using the cache management table 1000 and determines whether or not there is a need to destage data from the SSD cache (S440). In the case of determining by this check that there is a need for destaging (S440: Yes), the storage controller 100 selects data to be destaged by an algorithm such as LRU and by using the recently used time in recently used time 1007 in the cache management table 1000, and makes a request to the SSD cache for destaging (S441). That is, the storage controller 100 transmits a destaging request command 3500 (see FIG. 9). Processing in the SSD cache (more specifically, the hybrid SSD 200) receiving the destaging request will be described later with reference to FIG. 10.

After making the destaging request (S441) or in the case of determining that there is no need for destaging (S440: No), the storage controller 100 makes a request to the SSD cache for caching. That is, the storage controller 100 transmits a caching request command 3000 (see FIG. 8) (S442) and ends the caching request process. A caching request reply process in the SSD cache receiving the caching request will be described later with reference to FIG. 14.

Figure 8:
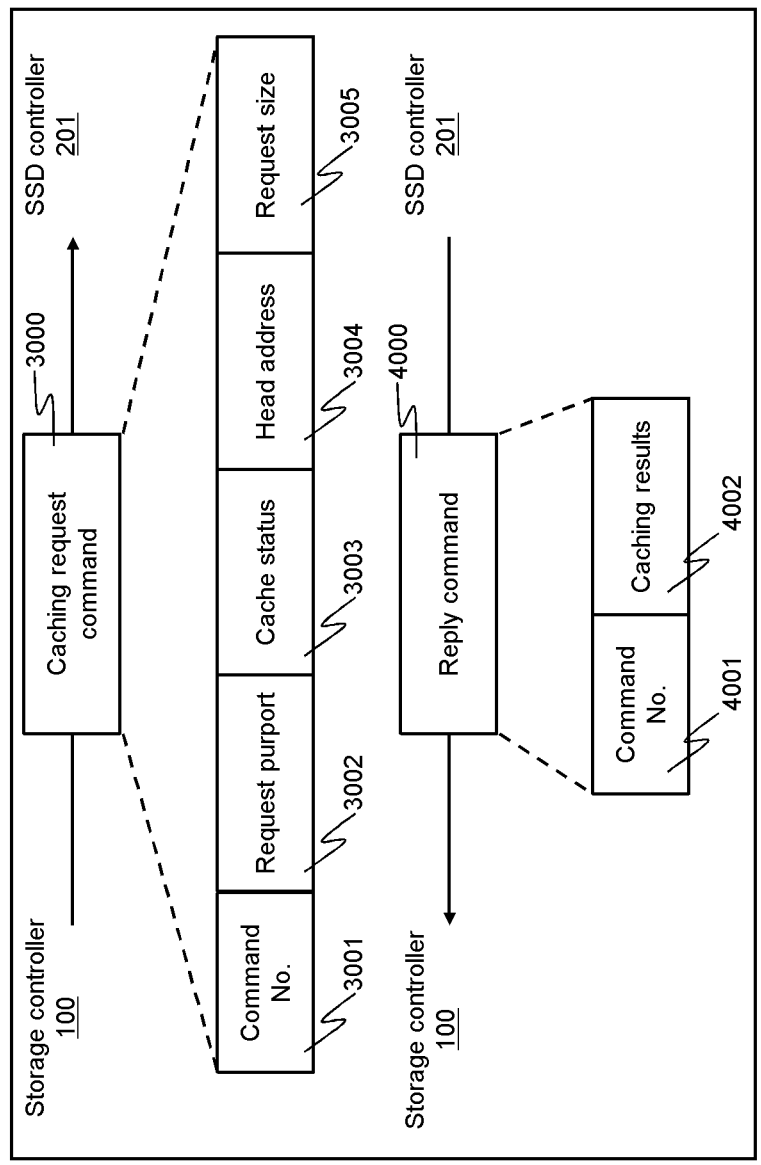
FIG. 8 is a diagram showing an example of a caching request command and a reply command in reply to the caching request command between the storage controller and an SSD controller according to Embodiment 1.

FIG. 8 is a diagram showing an example of a caching request command and a reply command in reply to the caching request command between the storage controller and the SSD controller according to Embodiment 1.

The caching request command 3000 is transmitted, for example, from the storage controller 100 to the SSD controller 201 in step S442 shown in FIG. 7. The caching request command 3000 includes fields of command No. 3001, request purport 3002, cache status 3003, head address 3004, and request size 3005. In command No. 3001, a command number (No.) for identification of the command is stored. In request purport 3002, a request purport that identifies the caching request is stored. In cache status 3003, the cache status of the data to be cached is stored. The cache status in cache status 3003 is used in the SSD controller 201 to select a storage place in which the data to be cached is to be stored. In head address 3004, a head address for the data to be cached is stored. In request size 3005, the size of the data to be cached is stored. In the present embodiment, the storage controller 100 transmits the cache status of a cache segment to the SSD controller 201 through the caching request command 3000. Timing of transmitting the cache status, however, is not limited to this.

The reply command 4000 transmitted from the SSD controller 201 to the storage controller 100 as a reply to the caching request command 3000 includes fields of command No. 4001 and caching results 4002. In command No. 4001, a command No. corresponding to the caching request command 3000 is stored. In caching results 4002, caching results are stored. The caching results may include caching success indicating a success in caching, or caching failure indicating failure to perform caching.

Figure 9:
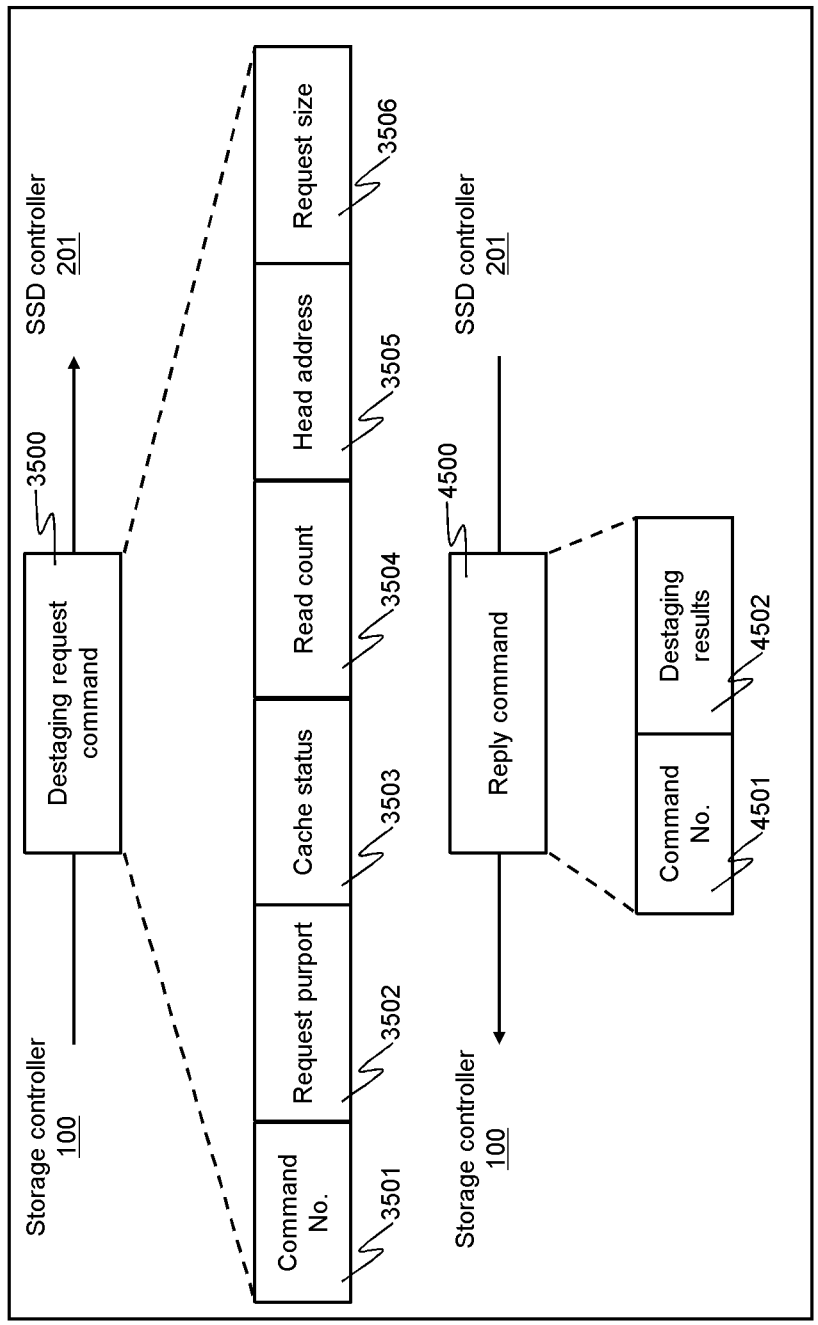
FIG. 9 is a diagram showing an example of a destaging request command and a reply command in reply to the destaging request command between the storage controller and the SSD controller according to Embodiment 1.

FIG. 9 is a diagram showing an example of a destaging request command and a reply command in reply to the destaging request command between the storage controller and the SSD controller according to Embodiment 1.

The destaging request command 3500 is transmitted, for example, from the storage controller 100 to the SSD controller 201 in step S441 shown in FIG. 7. The destaging request command 3500 includes fields of command No. 3501, request purport 3502, cache status 3503, read count 3504, head address 3505, and request size 3506.

In command No. 3501, a command number (No.) for identification of the command is stored. In request purport 3502, a request purport that identifies the destaging request is stored. In cache status 3503, the cache status of data to be destaged is stored. In read count 3504, the number of times the data to be destaged has been read (read count) is stored. In head address 3505, a head address for the data to be destaged is stored. In request size 3506, the size of the data to be destaged is stored.

The reply command 4500 transmitted from the SSD controller 201 to the storage controller 100 as a reply to the destaging request command 3500 includes fields of command No. 4501 and destaging results 4502. In command No. 4501, a command No. corresponding to the destaging request command 3500 is stored. In destaging results 4502, destaging results are stored.

Figure 10:
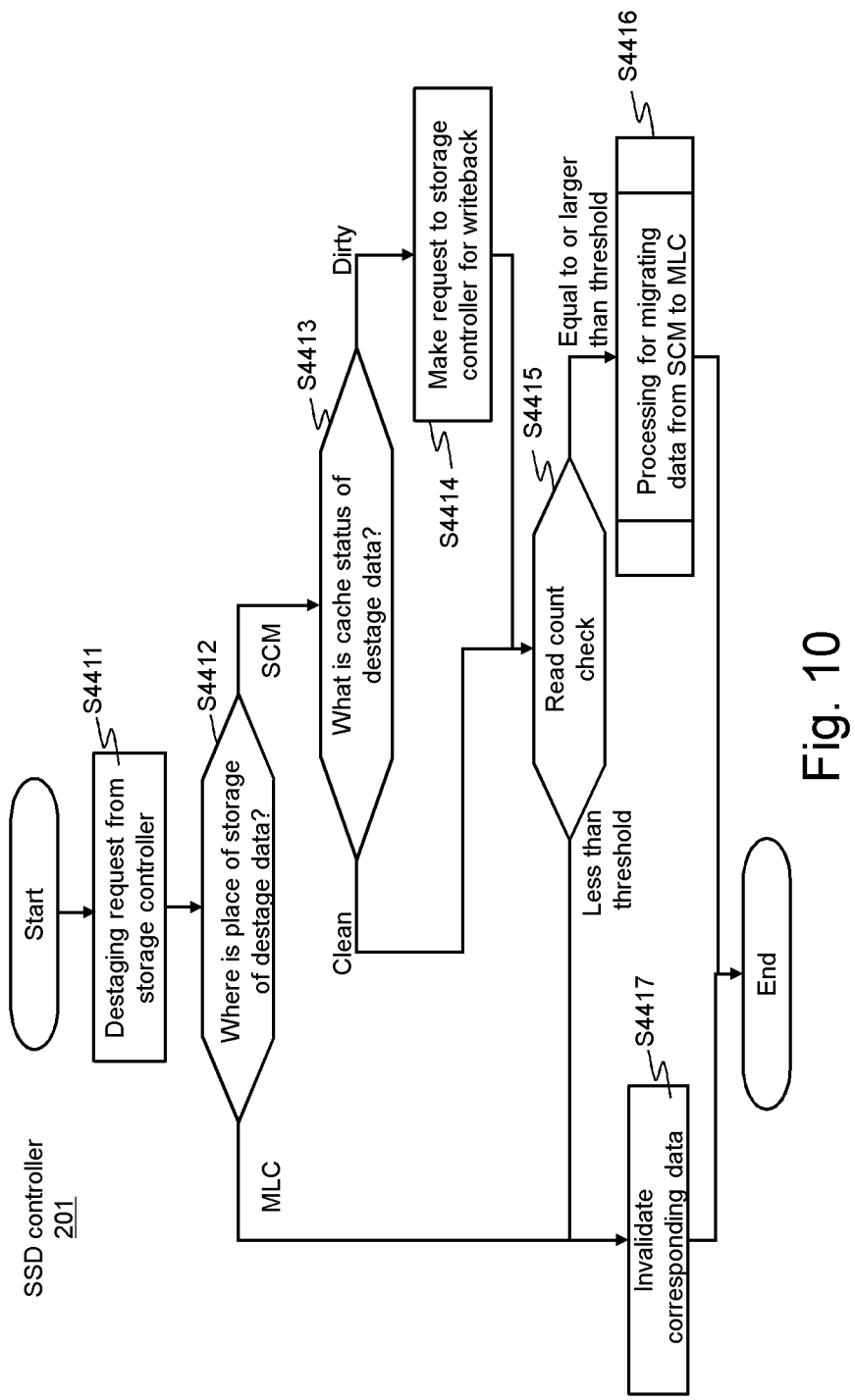
FIG. 10 is a flowchart of a destaging process in the SSD cache according to Embodiment 1.

FIG. 10 is a flowchart of a destaging process in the SSD cache according to Embodiment 1.

The destaging process is a process executed when the SSD controller 201 receives the destaging request command 3500 transmitted from the storage controller 100 (S441 in FIG. 7).

The SSD controller 201 receives the destaging request command 3500 from the storage controller 100 (S4411) and checks the storage place in which the data to be destaged according to the request (referred to as destage data in the description of the process shown in FIG. 10) is stored by referring to the logical/physical address conversion table 20000 (S4412). More specifically, by referring to the logical/physical address conversion table 20000, the SSD controller 201 checks whether a physical address in the SCM chip 2011 is assigned as the head address 3505 in the destaging request command 3500 or a physical address in the MLC FM chip 2012 is assigned as the head address 3505.

In the case of determining as a result of this check that the destage data is stored in the SCM chip 2011 (S4412: SCM), the SSD controller 201 checks the cache status in cache status 3503 in the destaging request command 3500 (S4413). If the cache status in cache status 3503 is "Dirty" (S4413: Dirty), the SSD controller 201 transmits to the storage controller 100 a writeback request 5000 (see FIG. 11) for writing back the destage data to the HDD 190 (S4414) and advances the process to step S4415. A writeback process executed by transmitting the writeback request 5000 will be described later with reference to FIG. 12. The dirty data to be destaged from the SCM chip 2011 can be suitably written back to the HDD 190 in this way.

If the cache status in cache status 3503 is "Clean" (S4413: Clean), the SSD controller 201 advances the process to step S4415.

In step S4415, the SSD controller 201 determines whether or not the read count in read count 3504 in the destaging request command 3500 is equal to or larger than a predetermined threshold. In read count 3504 in the destaging request command 3500, the count of the number of times the data has been read (read count), corresponding to the count taken on the same cache segment as shown in read count 1008 in the cache management table 1000, is stored.

If as a result of this determination the read count is equal to or larger than the predetermined threshold (S4415: equal to or larger than the threshold), the SSD controller 201 executes data moving processing (see FIG. 13) for migrating the destage data from the SCM chip 2011 to the MLC FM chip 2012 (S4416), thereby ending the destaging process in the SSD cache.

Since the cache capacity based on the SCM chip 2011 is smaller than the cache capacity based on the MLC FM chip 2012, data stored in the SCM chip 2011 is destaged more easily in comparison with data stored in the MLC FM chip 2012, and it is difficult to improve the rate of hits. Therefore, when the read count on the data is equal to or larger than the predetermined threshold, data moving processing shown as S4416 is performed to migrate the destage data from the SCM chip 2011 to the MLC FM chip 2012, thereby improving the rate of hits in the data read with high frequency. Because of read, there is substantially no influence on the lifetime of the MLC FM chip 2012.

In the present embodiment, the SSD cache capacity recognized by the storage controller 100 is not the sum of the capacities of the SCM chip 2011 and the MLC FM chip 2012 but only the capacity of the MLC FM chip 2012. Also, the capacity of the cache area based on the MLC FM chip 2012 is larger than the capacity of the cache area based on the SCM chip 2011. Therefore a free space always exists in the MLC FM chip 2012 to which destage data existing on the SCM chip 2011 is moved, and there is no need to destage data from the MLC FM chip 2012. Consequently, there is no need to perform processing for destaging data from the MLC FM chip 2012 before execution of data migrating processing.

If the destage data is stored in the MLC FM chip 2012 (S4412: MLC) or if the read count is less than the threshold (S4415: less than the threshold), the SSD controller 201 invalidates the destage data and ends the SSD cache destaging process.

The SSD cache destaging process is not limited to the flowchart shown in FIG. 10. For example, processing for checking the cache status, shown as S4413, may be performed subsequently to step S4411 without performing the step for checking the storage place (S4412). In such a case, a processing step for determining the place of storage of the destage data, similar to S4412, may be executed before processing in S4415, and the process may advance to S4417 if the checked storage place is the MLC FM chip 2012 or to S4415 if the checked storage place is the SCM chip 2011.

Figure 11:
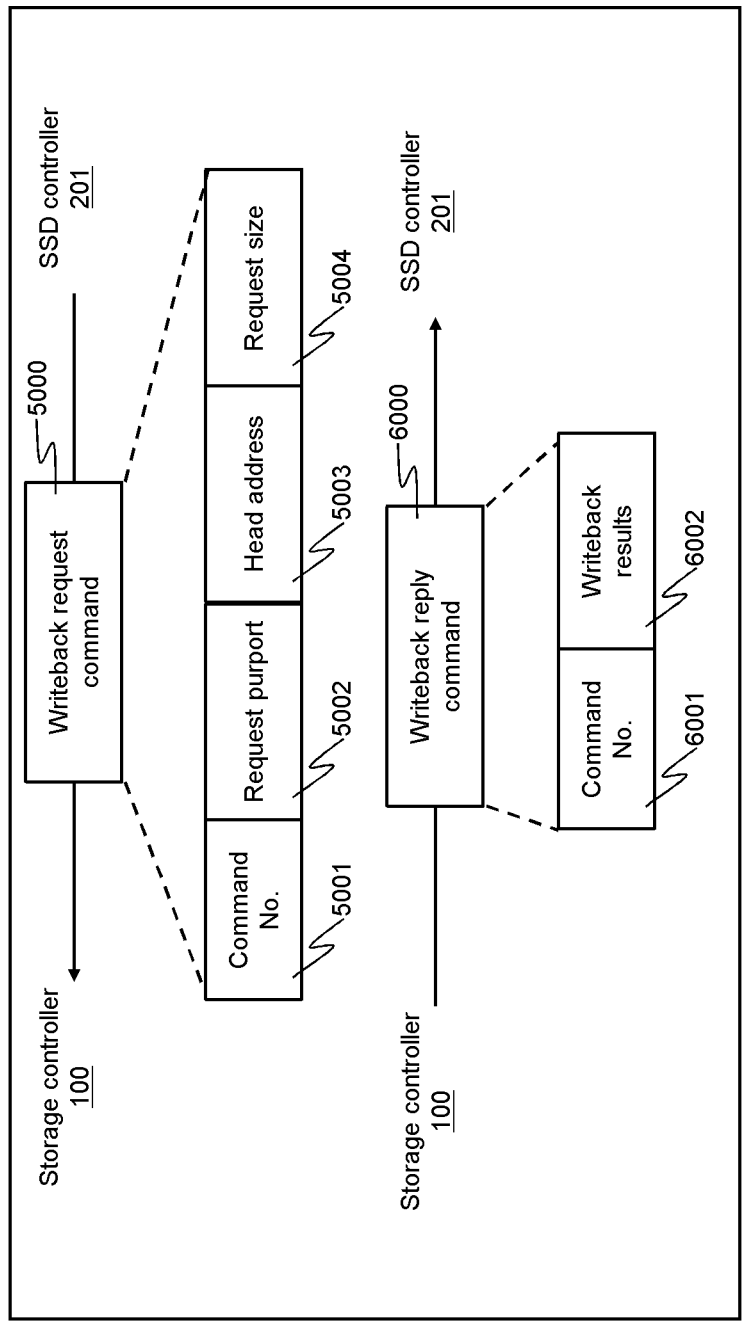
FIG. 11 is a diagram showing an example of a writeback request command and a reply command in reply to the writeback request command between the storage controller and the SSD controller according to Embodiment 1.

FIG. 11 is a diagram showing an example of a writeback request command and a reply command in reply to the writeback request command between the storage controller and the SSD controller according to Embodiment 1.

The writeback request command 5000 is transmitted, for example, from the SSD controller 201 to the storage controller 100 in step S4414 shown in FIG. 10. The writeback request command 5000 includes fields of command No. 5001, request purport 5002, head address 5003 and, request size 5004. In command No. 5001, a command number (No.) for identification of the command is stored. In request purport 5002, a request purport that identifies the writeback request is stored. In head address 5003, a head address for the data to be written back is stored. In request size 5004, the size of the data to be written back is stored.

The reply command 6000 transmitted from the storage controller 100 to the SSD controller 201 as a reply to the writeback request command 5000 includes fields of command No. 6001 and writeback results 6002. In command No. 6001, a command No. corresponding to the writeback request command 5000 is stored. In writeback results 6002, writeback results are stored.

Figure 12:
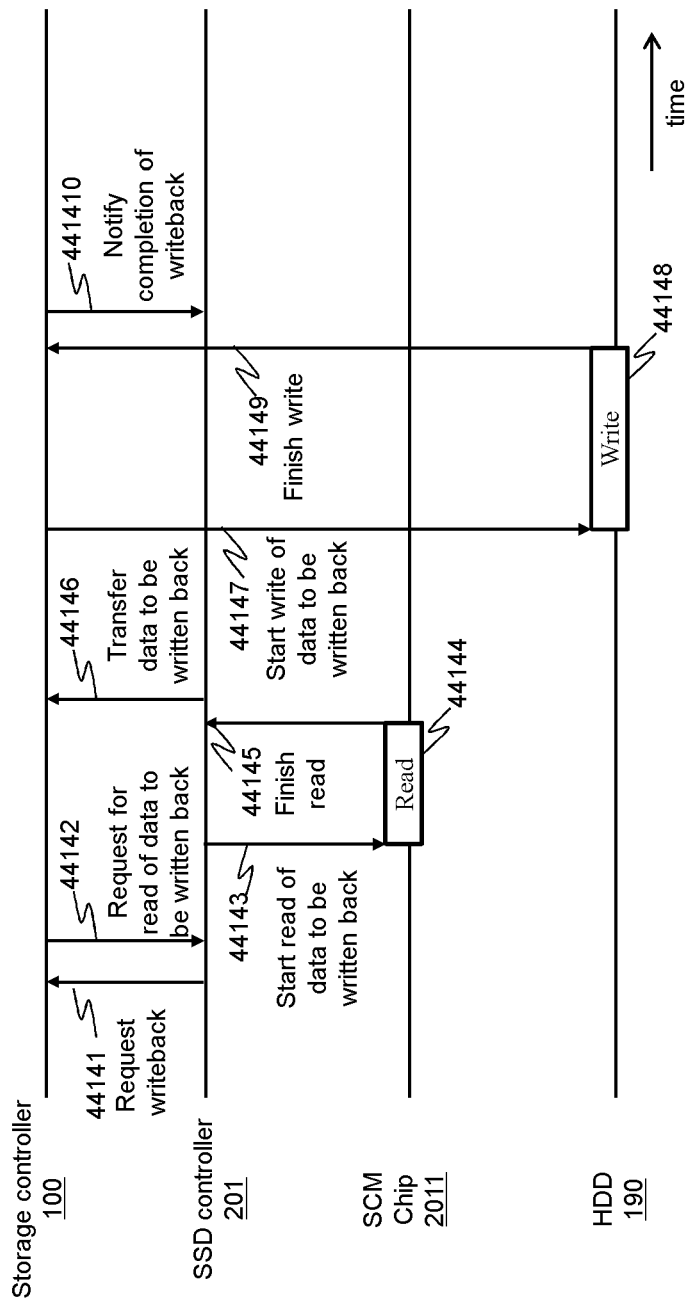
FIG. 12 is a diagram for explaining a process of writeback between the storage controller and the SSD controller according to Embodiment 1.

FIG. 12 is a diagram for explaining a process of writeback between the storage controller and the SSD controller according to Embodiment 1.

The writeback process is a process executed when the storage controller 100 receives the writeback request command 5000 transmitted from the SSD controller 201 (S4414 in FIG. 10).

The SSD controller 201 transmits the writeback request command 5000 to the storage controller 100 (44141), and the storage controller 100 receives the writeback request command 5000. The storage controller 100 starts writeback by issuing to the SSD controller 201 a read request for reading data to be written back (44142). The SSD controller 201 reads the data to be written back (writeback data) from the SCM chip 2011 according to the read request (44143, 44144) and, after the completion of read (44145), transfers the read writeback data to the storage controller 100 and notifies the DMA 141 in the storage controller 100 of transfer of the writeback data (44146).

The DMA 141 writes the writeback data to the HDD 190, which is the final storage device for the writeback data (44147, 44148, and 44149). Subsequently, after the completion of write of the writeback data, the storage controller 100 sets "clean (writeback)" in cache status 1005 in the entry corresponding to the writeback data in the cache management table 1000, and transmits a notice of the completion of writeback as reply command 6000 to the SSD controller 201 (441410).

Figure 13:
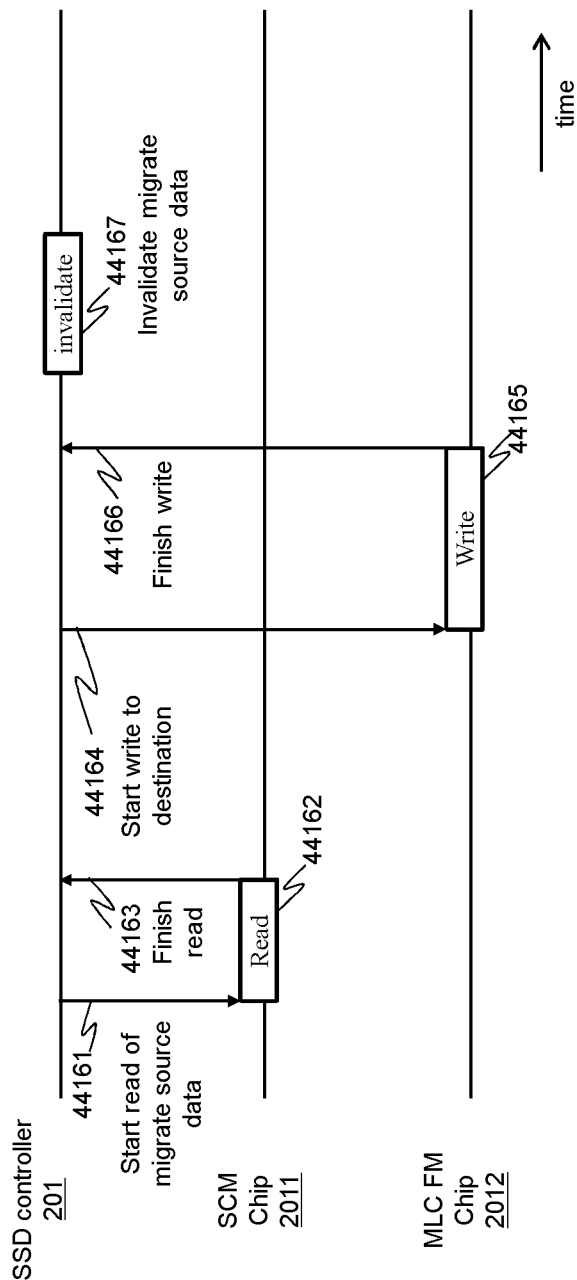
FIG. 13 is a diagram for explaining a process of migrating data in the SSD cache with the SSD controller according to Embodiment 1.

FIG. 13 is a diagram for explaining a process of migrating data in the SSD cache according to Embodiment 1.

The process of migrating data in the SSD cache is a process in which cache data is migrated from the SCM chip 2011 to the MLC FM chip 2012 to improve the rate of hits in the SSD cache, and which corresponds to step S4416 in FIG. 10.

The SSD controller 201 reads the data in the source place from the SCM chip 2011 in which the data to be migrated (the migrate source data) is stored (44161, 44162, and 44163) and thereafter writes the migrate source data to the MLC FM chip 2012 (44164, 44165, and 44166). After the completion of the migrate source data to the MLC FM chip 2012, the SSD controller 201 updates the logical/physical address conversion table 20000, that is, associates the physical address of the destination in the MLC FM chip 2012 with the logical address for the migrate source data, and invalidates the migrate source data in the SCM chip 2011 (44167), thus migrating the migrate source data from the SCM chip 2011 to the MLC FM chip 2012.

Figure 14:
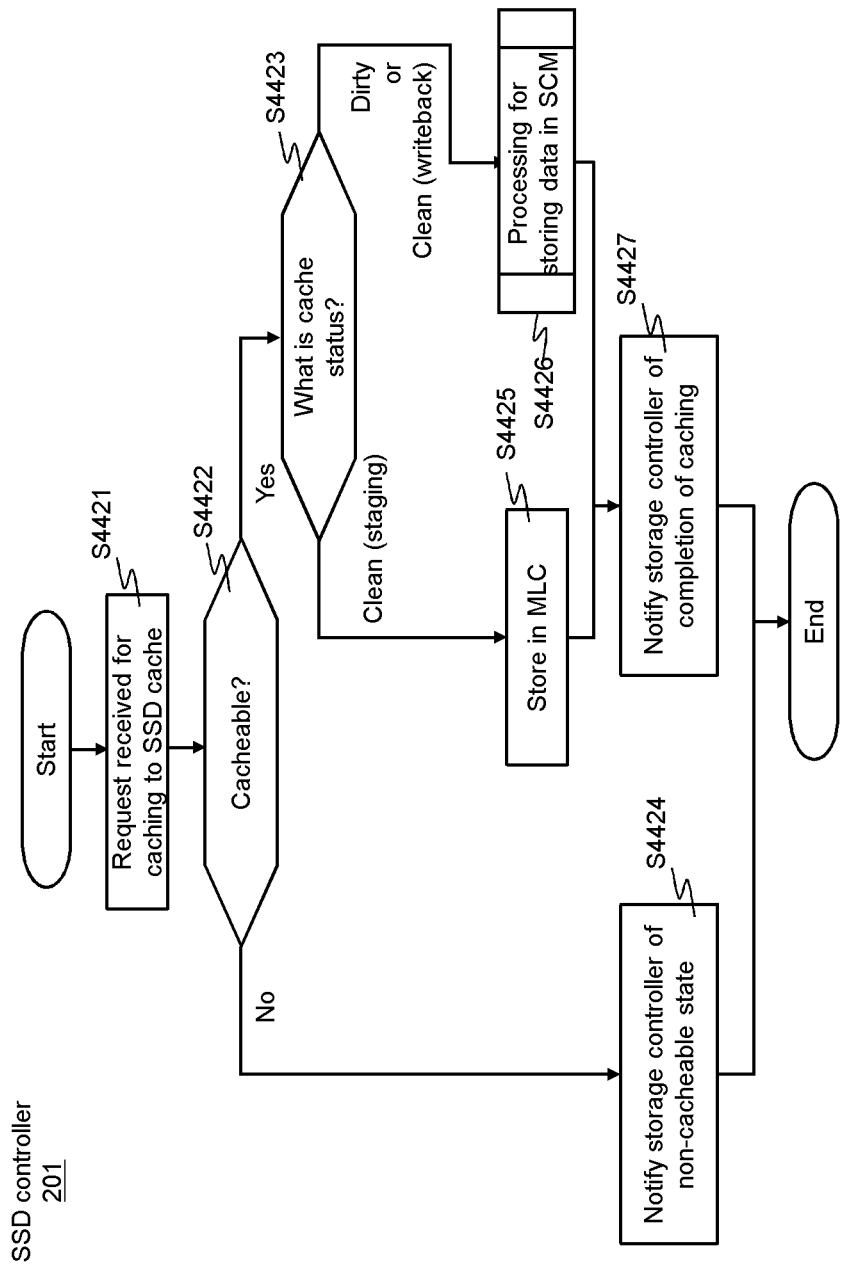
FIG. 14 is a flowchart of a caching request meeting process according to Embodiment 1.

FIG. 14 is a flowchart of a caching request meeting process according to Embodiment 1.

The caching request meeting process is a process executed when the SSD controller 201 receives the caching request command 3000 transmitted from the storage controller 100 (S442 in FIG. 7).

The SSD controller 201 receives the caching request command 3000 from the storage controller 100 (S4421) and determines whether or not the data can be cached in the SSD cache (S4422). This determination is made as to whether a condition that makes the SSD cache incapable of caching data, e.g., the occurrence of a failure in the SSD cache or the end of the lifetime of a chip constituting the SSD cache has occurred.

In the case of determining that caching cannot be performed (S4422: No), the SSD controller 201 notifies the storage controller 100 of the noncacheable condition through the reply command 4000 (S4424) and ends the caching request meeting process.

On the other hand, in the case of determining that caching can be performed (S4422: Yes), the SSD controller 201 determines which of the SCM chip 2011 and the MLC FM chip 2012 is to store the data to be cached according to the request from the storage controller 100 (S4423). To make this determination, the SSD controller 201 predicts a future update frequency with respect to the data to be cached. In this embodiment, the SSD controller 201 predicts an update frequency with respect to this data by using the cache status in cache status 3003 in the caching request command 3000 received from the storage controller 100. For example, the SSD controller 201 assumes that data rewritten after staging to the cache is also updated in future, judges that the frequency with which this data is updated is high, and judges that the frequency with which data not rewritten even once after being read from the HDD 190 to the cache (after staging) is updated is low. That is, the SSD controller 201 checks the cache status in cache status 3003 and judges that dirty data and clean (writeback) data recognized as updated after staging to the DRAM cache are data with a high update frequency, and judges that clean (staging) data recognized as not updated after staging to the DRAM cache is data with a low update frequency. A high frequency of updating of data basically means a large rewrite count and leads to consumption of update areas in the chip and an increase in erase count. Therefore, if data with a high update frequency is stored in the short-life MLC FM chip 2012, the lifetime of the MLC FM chip 2012 is reduced, resulting in a reduction in lifetime of the entire hybrid SSD 200.

Therefore, if the cache status is "dirty" or "clean (writeback)" (S4423: Dirty or Clean (writeback)), the SSD controller 201 executes data storing process (see FIG. 15) for storing the data designated by the request in the long-life SCM chip 2011 (S4426). On the other hand, if the cache status is "clean" (S4423: Clean (staging)), the SSD controller 201 executes data storing process for storing the data designated by the request in the MLC FM chip 2012 having a lifetime shorter than that of the SCM chip 2011 (S4425). The processes for storing data to the chips will be described later. Data with a high update frequency is stored in the long-life SCM chip 2011 as described above, so that the degradation of the MLC FM chip 2012 can be reduced and the lifetime of the entire hybrid SSD 200 can be extended.

After storing the data in step S4425 or S4426, the SSD controller 201 notifies the storage controller 100 of the completion of caching through the reply command 4000 (S4427) and thereafter ends the caching request meeting process.

Processing for storing data in the MLC FM chip 2012 (S4425 in FIG. 14) will next be described.

The storage controller 100 recognizes the capacity portion of the cache formed by the MLC FM chip 2012 in the hybrid SSD 200 as the secondary cache. Therefore, if there is no free space in the MLC FM chip 2012, the SSD cache destaging process shown in FIG. 10 is executed with the SSD controller 201 based on the destaging request (S441) from the storage controller 100 shown in FIG. 7 to secure a free space. As a result, the SSD controller 201 can immediately store data in segments for which a free space is secured in the SSD cache.

Processing for storing data in the SCM chip 2011 (S4426) will next be described.

Since in the cache management table 1000 the capacity portion of the cache formed by the MLC FM chip 2012 is managed as the secondary cache with respect to the SSD cache, the storage controller 100 cannot grasp a free space in the cache formed by the SCM chip 2011. It is, therefore, necessary for the SSD controller 201 to check whether or not there is a free space in the cache area formed by the SCM chip 2011. This operation is not required in the case of processing for storing data in the MLC FM chip 2012 (S4425). Processing for storing data in the SCM chip 2011 including this processing for checking a free space (S4426) will be described with reference to a chart.

Figure 15:
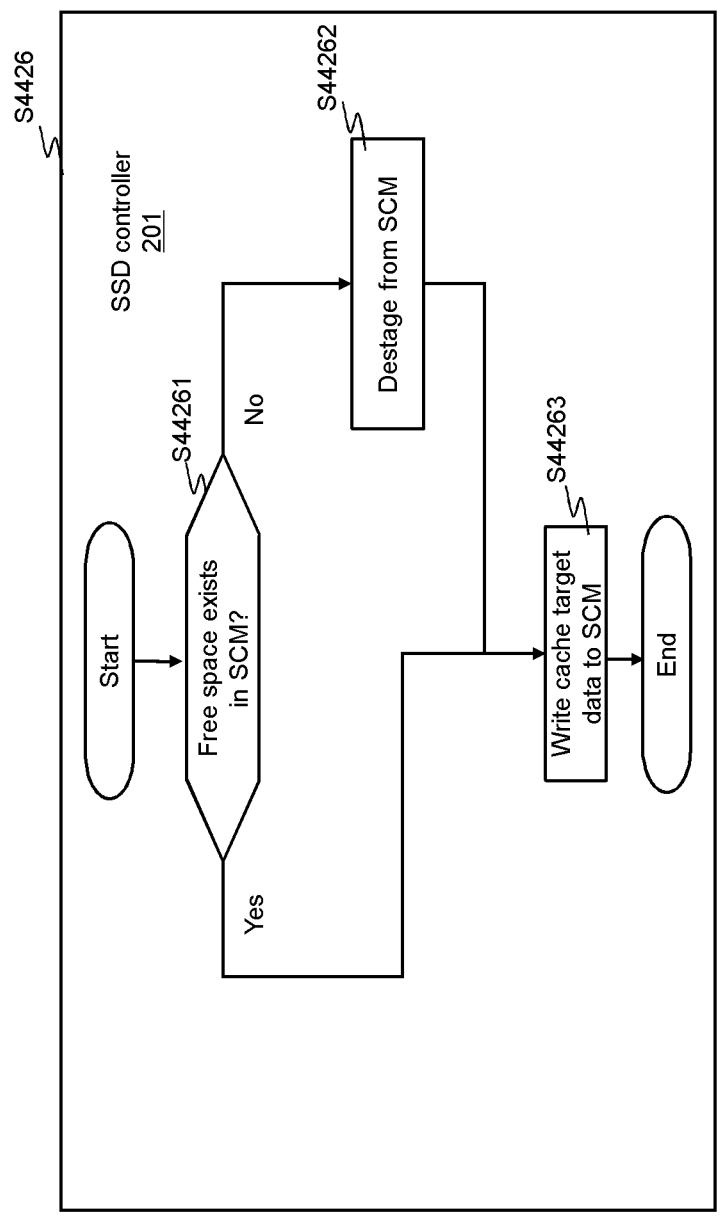
FIG. 15 is a flowchart of a data storing process according to Embodiment 1.

FIG. 15 is a flowchart of a data storing process according to Embodiment 1.

The SSD controller 201 checks a free space in the cache area on the SCM chip 2011 by using the logical/physical address conversion table 20000 (S44261). If there is no free space in the cache area on the SCM chip 2011 (S44261: No), the SSD controller 201 performs processing for destaging from the SCM chip 2011 (see FIG. 16) (S44262). After the execution of destaging processing, or if there is a free space in the cache area on the SCM chip 2011 (S44261: Yes), the SSD controller 201 stores the data to be cached in the secure free space on the SCM chip 2011 (S44263) and ends the data storing process.

Figure 16:
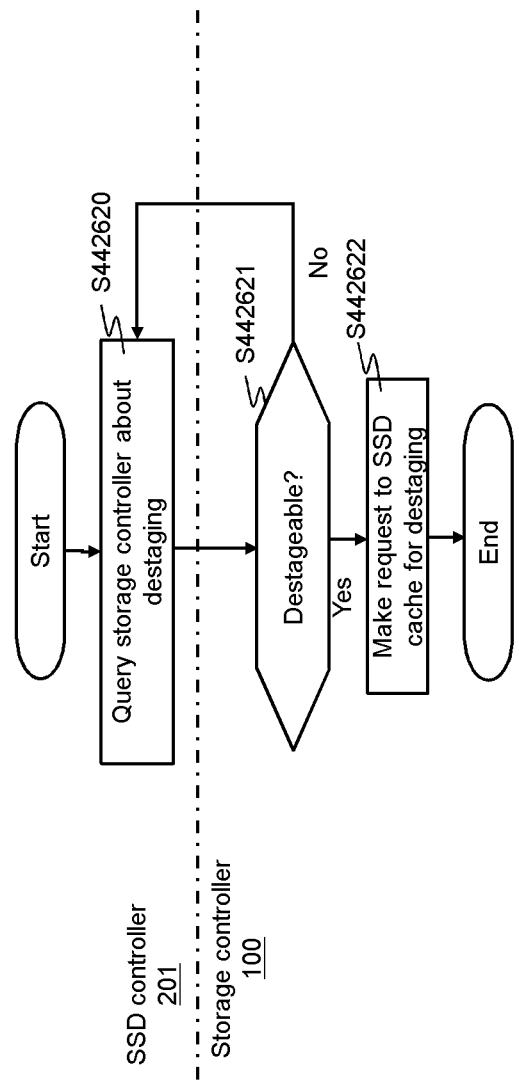
FIG. 16 is a flowchart of a process of destaging from an SCM chip according to Embodiment 1.

FIG. 16 is a flowchart of a process of destaging from the SCM chip according to Embodiment 1.

The process of destaging from the SCM chip corresponds to S44262 in the data storing process.

Since the SSD controller 201 cannot refer to the cache management table 1000, it cannot determine data to be destaged on the SCM chip 2011. Therefore the SSD controller 201 inquires of the storage controller 100 about data to be destaged (S442620). In this inquiry, the SSD controller 201 notifies the storage controller 100 of the logical address for the data about which the inquiry is made to determine whether or not the data can be destaged from the SCM device 2011. The logical address of the SSD controller 201 is the cache segment ID. The storage controller 100 refers to the cache management table 1000, identifies the entry in which the cache segment ID in cache segment ID 1001 corresponds to the notified cache segment ID, and determines, based on the recently used time in recently used time 1007 in this entry, by an algorithm such as LRU, whether or not the data corresponding to this entry can be destaged (S442621). If the data cannot be destaged (S442621: No), the storage controller 100 notifies the SSD controller 201 of this result. Receiving this notice, the SSD controller 201 again makes an inquiry about another batch of data (S442620). On the other hand, if the data can be destaged (S442621: Yes), the storage controller 100 issues a destaging request to the SSD controller 201 with respect to the data (S442622). Processing for issuing this destaging request (S442622) is the same as processing for issuing a destaging request in step S441 in FIG. 7. Receiving the destaging request, the SSD controller 201 executes the same process as that shown in FIG. 10.

Figure 17:
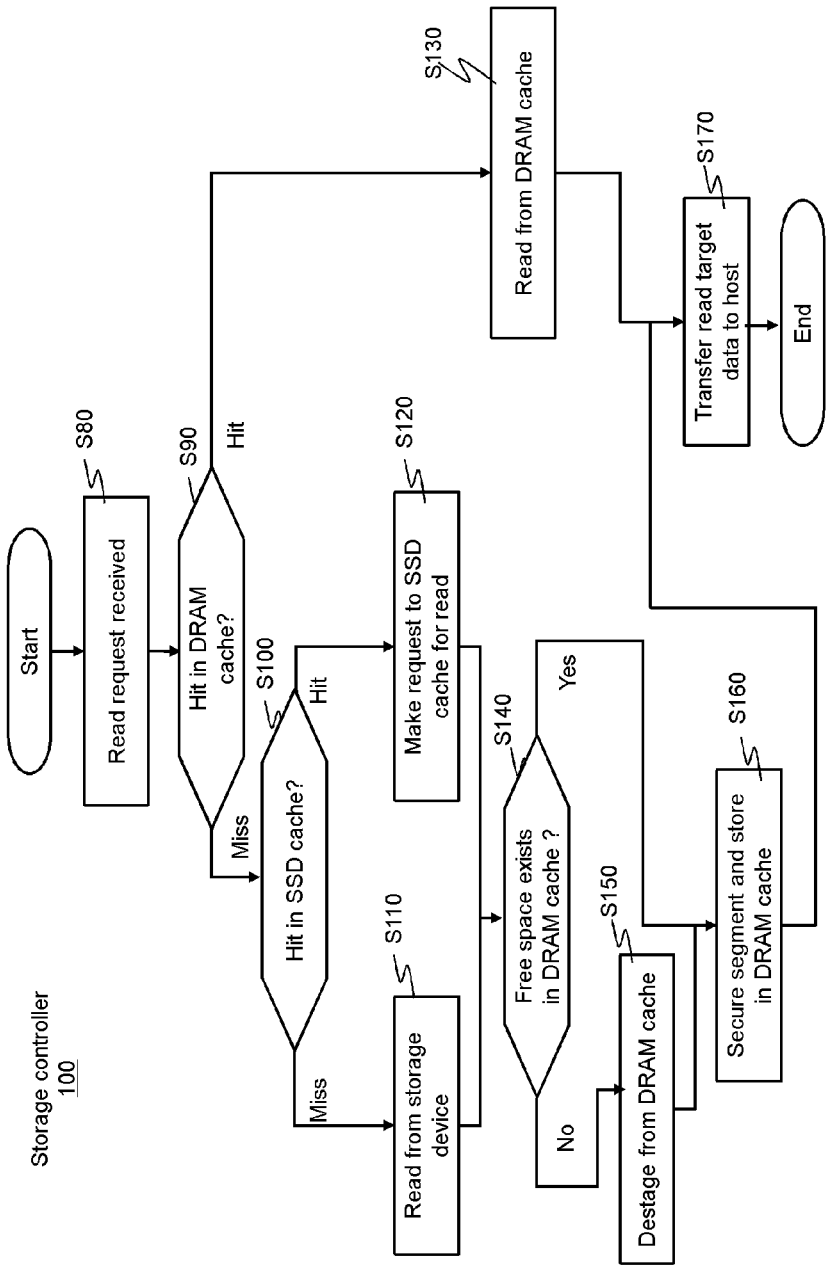
FIG. 17 is a flowchart of a process of read with the storage controller according to Embodiment 1.

FIG. 17 is a flowchart of a process of read with the storage controller according to Embodiment 1.

The process of read with the storage controller 100 is executed when the storage controller 100 receives a read request from the host computer 40.

The storage controller 100 checks, by referring to the cache management table 1000, whether or not the data to be read (read target data) is hit in the DRAM cache (S90). In the case of recognizing a hit in the DRAM cache by this check (S90: Hit), the storage controller 100 reads the read target data from the DRAM cache (S130) and advances the process to step S170.

In the case of recognizing no hit in the DRAM cache (S90: Miss), the storage controller 100 checks whether or not a hit occurs in the SSD cache (S100). In the case of recognizing a hit in the SSD cache by this check (S100: Hit), the storage controller 100 issues a read request to the SSD controller 201 (S120). A process of read from the SSD cache with the SSD controller 201 receiving the read request will be described later with reference to FIG. 18. In the case of also recognizing no hit in the SSD cache (S100: Miss), the storage controller 100 reads from the HDD 190 (S110).

In the case where the read target data is read from the SSD cache or the HDD 190 (S110, S120), the storage controller 100 performs processing described below to attain a hit on similar data in the highest-speed DRAM cache at the time of the next read. That is, the storage controller 100 checks a free space (free cache segment) in the DRAM cache by referring to the cache management table 1000 (S140). If there is no free space in the DRAM cache (S140: No), the storage controller 100 performs destaging data from the DRAM cache (S150), secures at least one cache segment, stores the read target data in the secured cache segment in the DRAM cache (S160) and advances the process to step S170. Processing for destaging data from the DRAM cache (S150) is the same as processing in step S40 in FIG. 5. If there is a free space in the DRAM cache (S140: Yes), the storage controller 100 secures at least one free cache segment in the DRAM cache, stores the read-target data in the cache segment (S160) and advances the process to step S170.

In step S170, the storage controller 100 transfers the read target data to the host computer 40 (S170) and ends the read process. The process steps (S140 to S160) for storing the read target data in the DRAM cache may be performed after the process step for transferring the read target data to the host computer 40 (S170).

Figure 18:
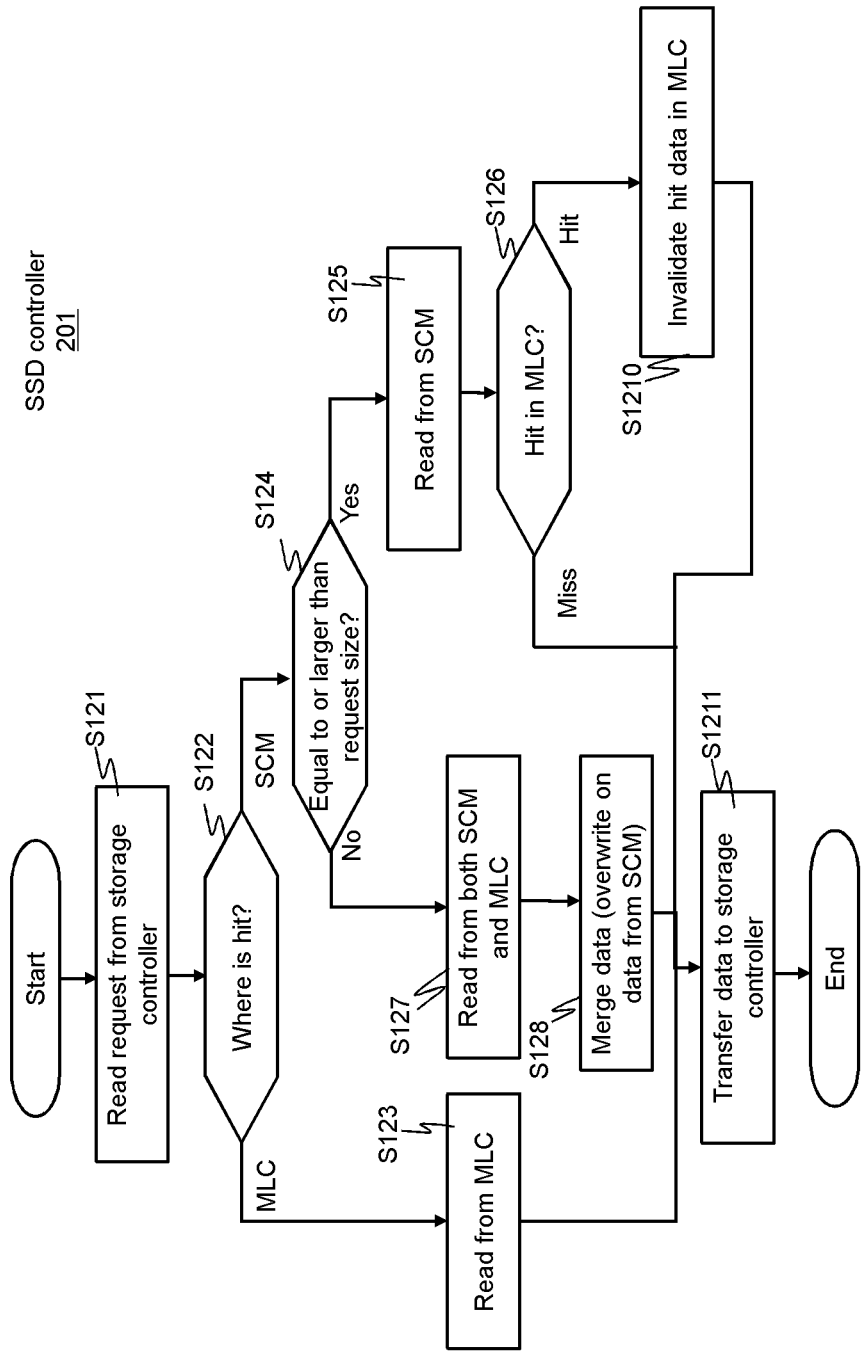
FIG. 18 is a flowchart of a process of read from the SSD cache according to Embodiment 1.

FIG. 18 is a flowchart of a process of read from the SSD cache according to Embodiment 1.

The process of read from the SSD cache is a process executed when the SSD controller 201 receives the read request transmitted from the storage controller 100 (S120 in FIG. 17).

The SSD controller 201 receives the read request from the storage controller 100 (S121) and checks the place of storage (hit place) of the target data according to the read request by referring to the logical/physical address conversion table 20000 (S122). In the case of recognizing a hit on the data in the MLC FM chip 2012 by this check (S122: MLC), the SSD controller 201 reads the read target data from the MLC FM chip 2012 (S123) and advances the process to step S1211.

In some case, the read target data according to a read request is hit in each of the SCM chip 2011 and the MLC FM chip 2012. For example, hits in such a mode can occur in a case where the size according to a read request covers a plurality of cache segment units or in a case where, cache statuses are managed in one cache segment with respect to areas in units smaller than the cache segment. This is because in a case where part of data cached in the MLC FM chip 2012 is updated by the host computer 40 and stored in the DRAM cache and the data is thereafter destaged from the DRAM cache, the updated portion is stored in the SCM chip 2011, while the unupdated portion is left stored in the MLC FM chip 2012.

To cope with such a situation, when a hit occurs in the SCM chip 2011 (S122: SCM), the SSD controller 201 compares the size of the target data according to the read request from the storage controller 100 and the size of the hit data (S124). It is possible to check, by making this comparison, whether or not there are hits in both the SCM chip 2011 and the MLC FM chip 2012. If the size of the data hit in the SCM chip 2011 is smaller than the size of the target data according to the read request (S124: No), this state means the existence in the MLC FM chip 2012 of part of the entire data corresponding to the shortfall in the amount of data. Therefore the SSD controller 201 reads the read target data from the SCM chip 2011 and the MLC FM chip 2012 (S127), merges the data from the SCM chip 2011 and the data from the MLC FM chip 2012, for example, by overwriting on the data from the SCM chip 2011 to prepare the read target data (S128) and advances the process to step S1211. The read target data can be suitably read in this way even though it is distributed to the SCM chip 2011 and the MLC FM chip 2012.

On the other hand, if the size of the data hit in the SCM chip 2011 is equal to or larger than the size of the target data according to the read request (S124: Yes), this state means the existence of the entire read target data in the SCM chip 2011. Therefore the SSD controller 201 reads the read target data only from the SCM chip 2011 (S125). Since the data hit in the MLC FM chip 2012 overlaps the data stored in the SCM chip 2011, the SSD controller 201 operates as described below. The SSD controller 201 determines whether or not the read target data is hit in the MLC FM chip 2012 (S126). If the data is hit (S126: Hit), the SSD controller 201 invalidates the hit data in the MLC FM chip 2012 (S1210) and advances the process to step S1211. If the read target data is not hit in the MLC FM chip 2012 (S126: No), the SSD controller 201 advances the process to step S1211.

In step S1211, the SSD controller 201 transfers the read target data to the storage controller 100 (S1211) and ends the read process. Processing for invalidating the data hit in the MLC FM chip 2012 (S1210) may be executed after transferring the read target data to the storage controller 100 (S1211).

In the storage system according to Embodiment 1, the hybrid SSD 200 determines a storage place for cache data. There is, therefore, no need to set in the storage controller 100 configuration information on the internal chips of the hybrid SSD 200 for example. The storage controller 100 may only transmit cache statuses to the hybrid SSD 200. Therefore the storage controller 100 can be easily configured.

Embodiment 2

A storage system according to Embodiment 2 will next be described.

Figure 19:
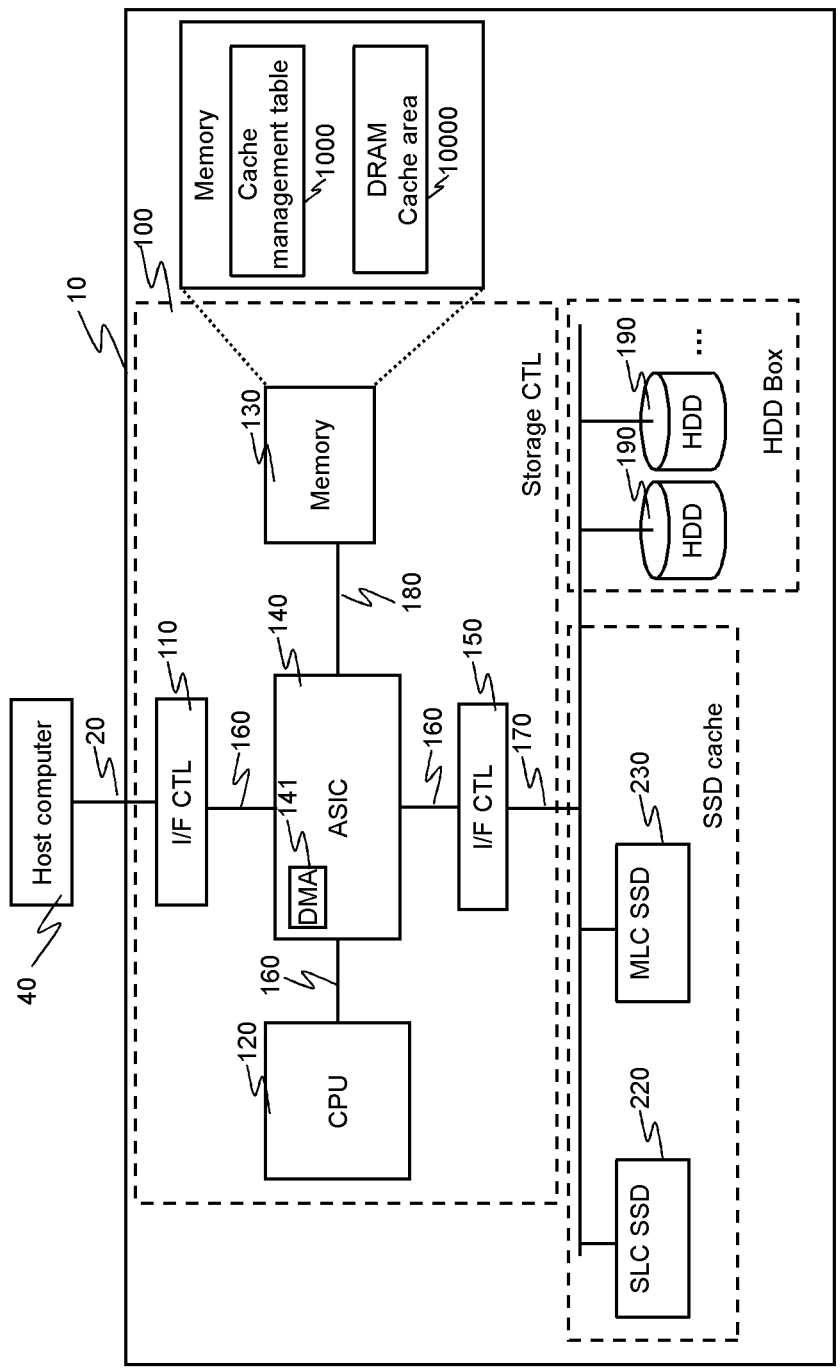
FIG. 19 is a diagram of the configuration of an example of a storage system according to Embodiment 2.

FIG. 19 is a diagram of the configuration of an example of a storage system according to Embodiment 2.

The storage system according to Embodiment 2 comprises an SLC SSD 220 and an MLC SSD 230 provided in place of the hybrid SSD 200 in the storage system according to Embodiment 1.

A storage apparatus 10 according to Embodiment 2 includes a storage controller 100, and the SLC SSD 220 and the MLC SSD 230 as an SSD cache (secondary cache).

The SLC SSD 220 is a device including an SLC-type NAND flash memory chip having an initial lifetime longer than that of the MLC SSD 230. The SLC SSD 220 is an example of a long-life device (second storage part). The MLC SSD 230 is a device including an MLC-type NAND flash memory chip having an initial lifetime shorter than that of the SLC SSD 220. The MLC SSD 230 is an example of a short-life device (first storage part). The configurations of the storage controller 100 and HDDs 190 are the same as those in Embodiment 1.

Processes or the like in the storage system according to Embodiment 2 are the same as those understood by rereading the description of the processes or the like in the storage system according to Embodiment 1 with reference to the drawings while replacing the SCM chip 2011 with the SLC SSD 220 and replacing the MLC FM chip 2012 with the MLC SSD 230, except with respect to differences described later.

The storage system according to Embodiment 2 will be described with respect the difference from Embodiment 1.

In the storage system according to Embodiment 2, information indicating one of the SLC SSD 220 and the MLC SSD 230 is managed with respect to the SSDs by being stored in storage place 1004 in the cache management table 1000. There is a need to set configuration information as to what kinds of storage device the SSDs connected to the storage controller 100 are from a management terminal or a computer such as SVP not illustrated to the storage controller 100.

The storage system according to Embodiment 2, the SSD cache destaging process shown in FIG. 10 and the caching request meeting process shown in FIG. 14 are executed by the storage controller 100. Accordingly, processes executed between the SSD controller 201 and the storage controller 100 as described above are executed by the storage controller 100. As a result, the need for processes including information exchange between the SSD controller 201 and the storage controller 100 is eliminated.

For example, in step S4414 shown in FIG. 10, therefore, the storage controller 100 does not issue any writeback request, while processes with the storage controller 100 and the SSD controller 201 in the writeback process shown in FIG. 12 are executed. Also, in step S4416, the storage controller 100 executes the processing performed by the SSD controller 201 in the data moving processing shown in FIG. 13. That is, the storage controller 100 issues to the SLC SSD 220 a command to read the migrate source data, and issues a write command to the MLC SSD 230 after the completion of read of the data from the SLC SSD 220.

In the caching request meeting process shown in FIG. 14, the storage controller 100 according to Embodiment 2 checks the cache status stored in cache status 1005 in the cache management table 1000 with respect to data destaged from the DRAM cache, predicts an update frequency, as in Embodiment 1, selects the SLC SSD 220 as a storage place for data with a high predicted update frequency, and selects the MLC SSD 230 as a storage place for data with a low predicted update frequency.

In the caching request meeting process shown in FIG. 14, since the storage controller 100 executes the caching request meeting process, there is no need for processing in steps S4424 and S4427.

When storing data to the SLC SSD 220 (S4426), the storage controller 100 can check the existence/nonexistence of a free space in the SLC SSD 220 by referring to the cache management table 1000. Therefore determination as to whether or not there is a need for destaging from the SLC SSD 220 can be made at the time of performing step S440 shown in FIG. 7. Accordingly, in the storage system according to Embodiment 2, a write request is issued to the SLC SSD 220 in the data storing process shown in FIG. 15 without executing steps S44261 and S44262.

Also, the storage controller 100 in Embodiment 2 executes the process of read from the SSD cache shown in FIG. 18. In the process of read from the SSD cache, therefore, the storage controller 100 makes hit/miss determination by using the cache management table 1000, reads data from the SLC SSD 220 and/or the MLC SSD 230 according to the result of this determination and performs processing including merging data and invalidating data in the MLC SSD 230 as required.

In the storage system according to Embodiment 2, it is not necessary for each of the SLC SSD 220 and the MLC SSD 230 to determine selection from places for storage of data to be cached. Therefore ordinary SSDs can be used as the SLC SSD 220 and the MLC SSD 230.

Embodiment 3

A storage system according to Embodiment 3 will next be described.

Figure 20:
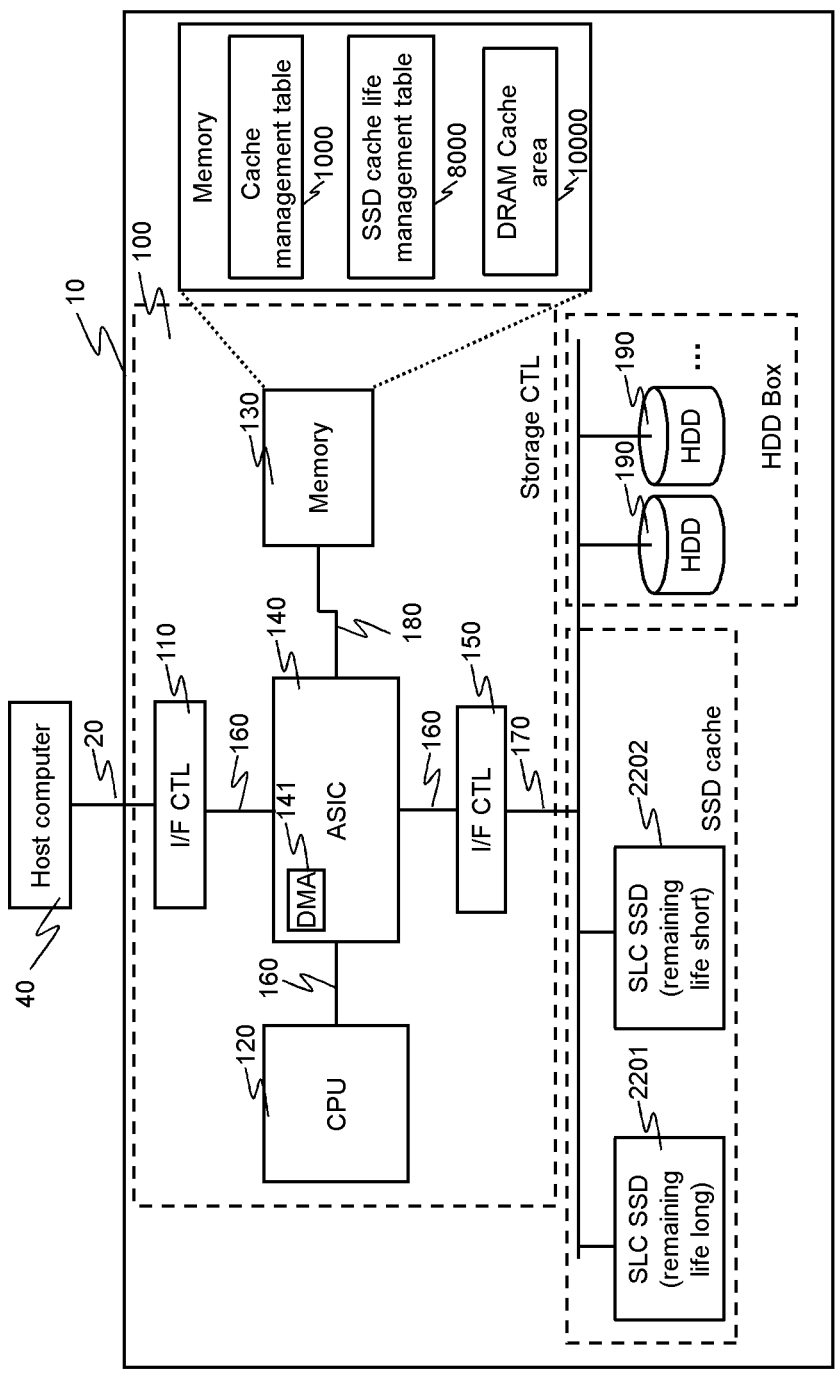
FIG. 20 is a diagram of the configuration of an example of a storage system according to Embodiment 3.

FIG. 20 is a diagram of the configuration of an example of a storage system according to Embodiment 3.

The storage system according to Embodiment 3 has an SSD cache life management table 8000 stored in the memory 130 in the storage system according to Embodiment 2. The storage system according to Embodiment 3 also uses SSDs of the same kind (SLC SSDs 2201, 2202) having different remaining lifetimes in place of the different kinds of SSDs: SLC SSD 220 and MLC SSD 230.

Each of the SLC SSD 2201 and SLC SSD 2202 is a device including an SLC-type NAND flash memory chip. The SLC SSD 2201 has a remaining lifetime longer than that of the SLC SSD 2202. The SLC SSD 2201 is an example of a long-life device (an example of the second storage part). The SLC SSD 2202 is an example of a short-life device (an example of the first storage part).

Cache control in the storage system according to Embodiment 3 is generally the same as cache control according to Embodiment 2. Description will be made of the difference in cache control between Embodiment 3 and Embodiment 2.

In the storage system according to Embodiment 3, the storage controller 100 not only performs update frequency prediction using the cache status but also selects from storage place SSDs for storing cache data based on the remaining lifetimes in the SSD cache.

Figure 21:
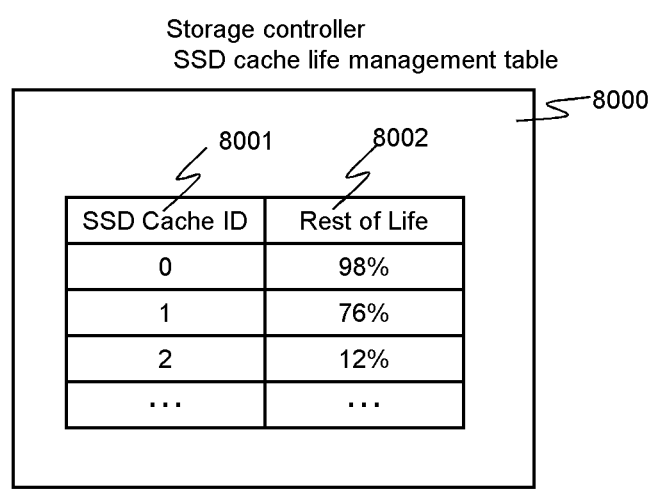
FIG. 21 is a diagram showing an example of an SSD cache life management table according to Embodiment 3.

FIG. 21 is a diagram showing an example of the SSD cache life management table according to Embodiment 3.

The SSD cache life management table 8000 is a table in which the remaining lifetimes of the SSDs are managed. The SSD cache life management table 8000 is stored in the memory 130 of the storage controller 100.

In the SSD cache life management table 8000, management on the SSDs is performed through entries including fields of SSD cache ID 8001 and rest of life 8002. In SSD cache ID 8001, SSD caches ID for identification of the SSDs used as a secondary cache are stored. In rest of life 8002, the remaining lifetime of the SSD corresponding to the SSD cache ID in SSD cache ID 8001 in the same entry is stored. In the present embodiment, the remaining lifetime is, for example, information indicating what percent of the lifetime remains. The remaining lifetime of an ordinary SSD can be obtained by using a standard interface provided in advance in the ordinary SSD. As the remaining lifetime, information on the erase count on a block basis in the flash memory may be used. In such a case, the storage controller 100 may obtain the erase counts on a block basis in the flash memory chips between the SSDs.

In the caching request meeting process shown in FIG. 14, in the case of predicting that frequency with which data is updated is high, for example in the case that the cache status is "dirty" or "clean (writeback)" (S4423: Dirty or Clean (writeback)), the storage controller 100 according to Embodiment 3 checks the SSD cache life management table 8000 and stores cache data in the SSD having a longer remaining lifetime (the SLC SSD 2201 in the example shown in FIG. 20) (S4426). In the case of predicting that frequency with which data is updated is low, for example in the case that the cache status is "clean (staging)" (S4423: Clean (staging)), the storage controller 100 stores cache data in the SSD having a shorter remaining lifetime (the SLC SSD 2202 in the example shown in FIG. 20) (S4425).

In the storage system according to Embodiment 3, even though SSDs including different kinds of storage devices are not provided, the same control of cache data storage places as those in Embodiment 1 and Embodiment 2 can be performed by using the difference between the lifetimes of the storage devices in the SSDs. Degradation of the short-life storage device can be effectively limited and the lifetime of the entire storage apparatus 10 can be extended.

Embodiment 4

A storage system according to Embodiment 4 will next be described.

Figure 22:
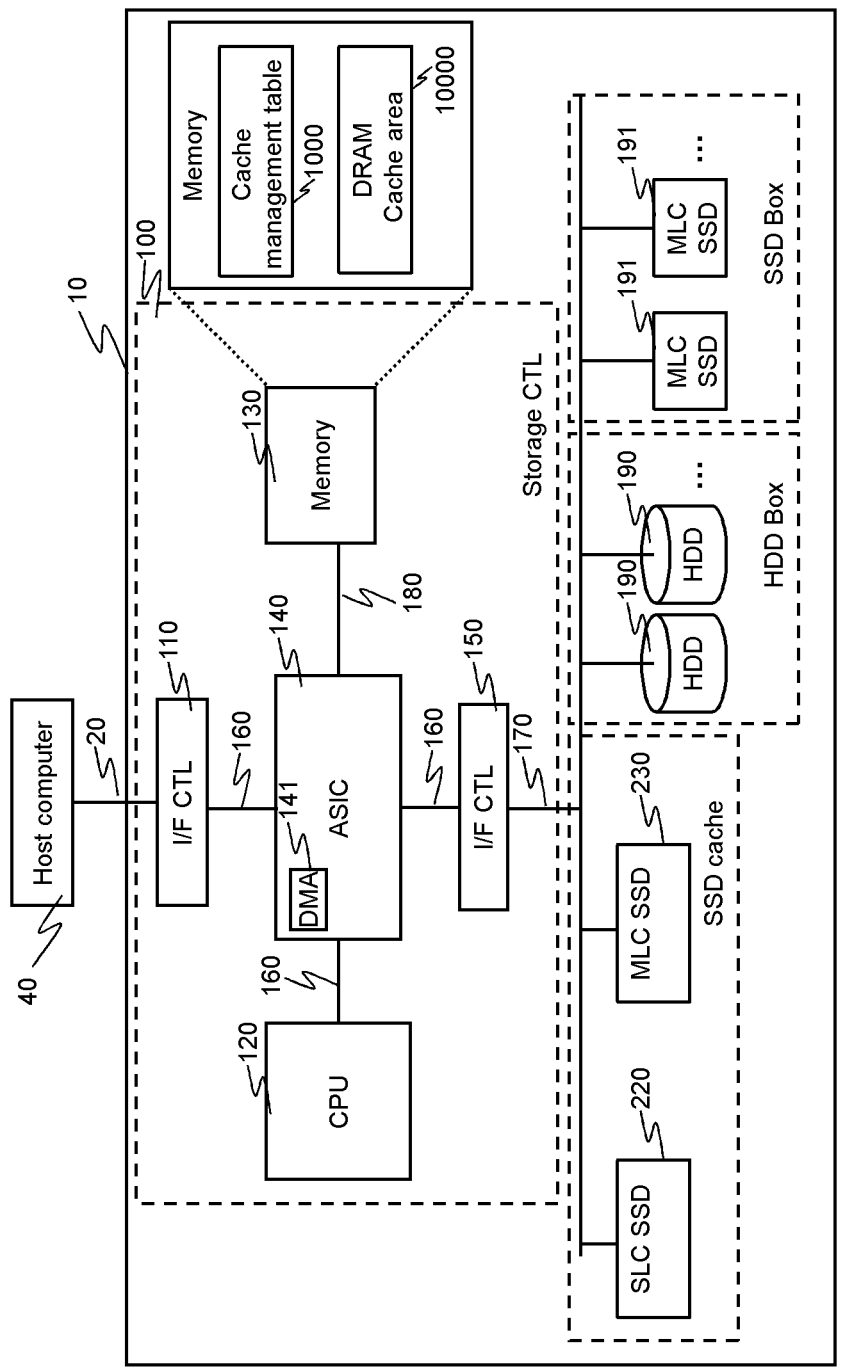
FIG. 22 is a diagram of the configuration of an example of a storage system according to Embodiment 4.

FIG. 22 is a diagram of the configuration of an example of a storage system according to Embodiment 4.

The storage system according to Embodiment 4 comprises at least one MLC SSD 191 added to the storage system according to Embodiment 2 shown in FIG. 19. The MLC SSD 191 is used as a storage device in which data is finally stored. FIG. 22 shows an example of use of the SLC SSD 220 and the MLC SSD 230 as an SSD cache. However, the hybrid SSD 200 shown in Embodiment 1 may be used in place of these SSDs, and SSDs of the same kind (e.g., SLC SSDs 2201, 2202) having different remaining lifetimes may alternatively be used as shown in Embodiment 3.

As cache control in the storage system according to Embodiment 4, basically the same control as that in one of the above-described embodiments having arrangements suitable for SSDs used as an SSD cache is performed.

The storage system according to Embodiment 4 will be described with respect to points of difference from the above-described embodiments.

The storage system according to Embodiment 4 uses a different process of destaging from the DRAM cache.

Figure 23:
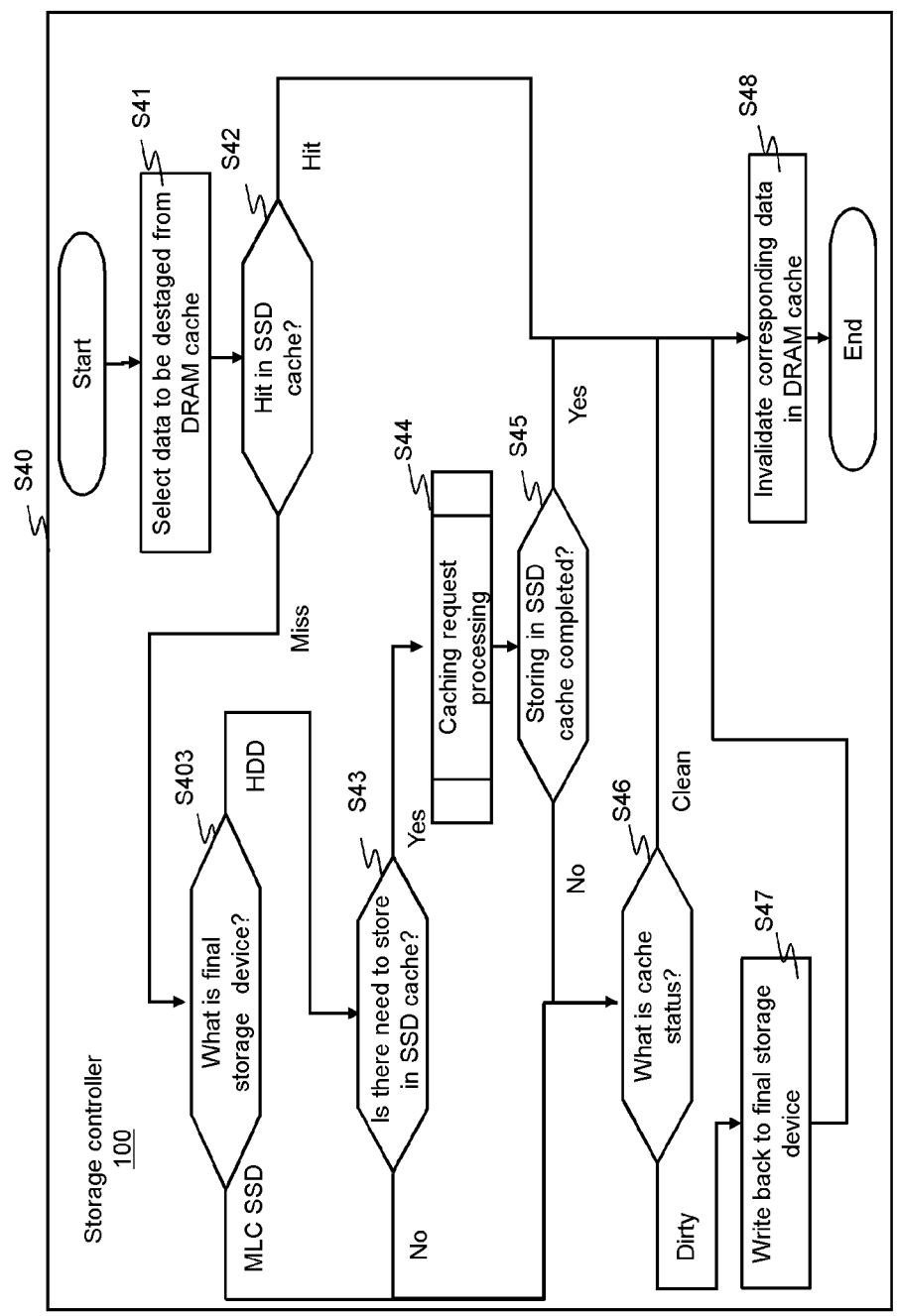
FIG. 23 is a flowchart of a process of destaging from the DRAM according to Embodiment 4.

FIG. 23 is a flowchart of a process of destaging from the DRAM according to Embodiment 4. Portions of the process similar to those of the process of destaging from the DRAM according to Embodiment 1 shown in FIG. 6 are indicated by the same reference characters.

If the data to be destaged (referred to as "target data" in the description with reference to FIG. 23) is not hit in the SSD cache in step S42 (S42: Miss), the storage controller 100 according to Embodiment 4 checks the kind of the storage device in which the target data is finally stored (final storage device) (S403). Information on final storage devices for target data may be managed, for example, by adding a field for the kinds of the final storage devices to the cache management table 1000 shown in FIG. 4, and the desired information may be obtained from the field. Also, a kind of device as a source of a volume may be obtained from a volume table (not shown) generally managed by the storage controller 100.

Next, if the kind of the final storage device for the target data is MLC SSD 191 (S403: MLC SSD), the storage controller 100 does not cache the target data in the SSD cache (S48) if target data is "clean" (S46: Clean), because data in the MLC SSD 191 can be accessed at a high speed even if the data is not cached, and because the advantage of storing in the SSD cache is low. On the other hand, if the target data is dirty (S46: Dirty), the storage controller 100 writes back the target data to the MLC SSD 191 without caching the data in the SSD cache (S47). In the case where the target data is dirty, the target data may be cached in the SSD cache. For example, an SSD, such as the MLC SSD 191, including a short-life device such as an MLC-type NAND flash memory, is used, data may be cached to an SSD cache having a long-life device such as an SCM chip. The lifetime of the MLC SSD 191 can be extended in this way. If the SSD cache is a device having a lifetime substantially equal to that of the final storage device, write-back to the final storage device may be made without caching in the SSD cache.

In Embodiment 4, in a case where a final storage device is an SSD similar to the secondary cache, useless caching in the secondary cache can be avoided, thus reducing the degradation of the secondary cache.

Embodiment 5

A storage system according to Embodiment 5 will next be described.

The configuration of the storage system according to Embodiment 5 is similar to that of the storage system according to Embodiment 1 shown in FIG. 1.

The storage system according to Embodiment 5 has the hybrid SSD 200 designed to have a cache management function to manage the SSD cache in the storage system according to embodiment 1.

The storage controller 100 does not manage the storage area in the SSD cache in the cache management table 1000 but manages only the storage area in the DRAM cache. The storage controller 100 issues an inquiry to the hybrid SSD 200 in the event of a miss in the DRAM cache, receives the result of hit/miss determination on the SSD cache from the hybrid SSD 200, and makes a caching request or a read request according to the determination result. When the SSD controller 201 receives the caching request from the storage controller 100, it makes a request to the storage controller 100 for destaging if there is no free space in the SSD cache.

FIG. 24 is a diagram showing an example of an SSD cache management table according to Embodiment 5.

An SSD cache management table 2000 is a table for managing cache data in the SSD cache. The SSD cache management table 2000 is stored in the memory 205. In the present embodiment, information managed in the logical/physical address conversion table 20000 shown in FIG. 3 is also managed in the SSD cache management table 2000.

In the SSD cache management table 2000, management with respect to each of the cache segments is performed by means of an entry including fields of cache segment ID 2001, LBA 2002, physical address 2003, cache size 2004, cache status 2005, recently used time 2006, and read count 2007.

In cache segment ID 2001, an identifier (cache segment ID) for identification of a cache management unit is stored. In LBA 2002, a logical address for cache data assigned to the cache segment designated by the cache segment ID in cache segment ID 2001 in the same entry is stored. In physical address 2003, a physical address assigned to the cache segment is stored. In cache size 2004, the size of valid data in the cache segment designated by the cache segment ID in cache segment ID 2001 in the same entry is stored. In cache status 2005, information indicating the state of the data stored in the cache segment corresponding to the cache segment ID in cache segment ID 2001 in the same entry is stored. The concrete contents are the same as those in cache status 1005 shown in FIG. 4. In recently used time 2006, the recent time when access was made to cache data (recently used time) is stored. In read count 2007, the number of times cache data has been read (read count) is stored.

A caching request by the storage controller 100 is issued to the SSD controller 201 by means of the caching request command 3000 shown in FIG. 8. The SSD controller 201 looks up the cache segment ID in the SSD cache from the LBA of cache data contained in the caching request command 3000, assigns a physical address to the cache segment, and stores the cache data in the storage area designated by the physical address.

Figure 25:
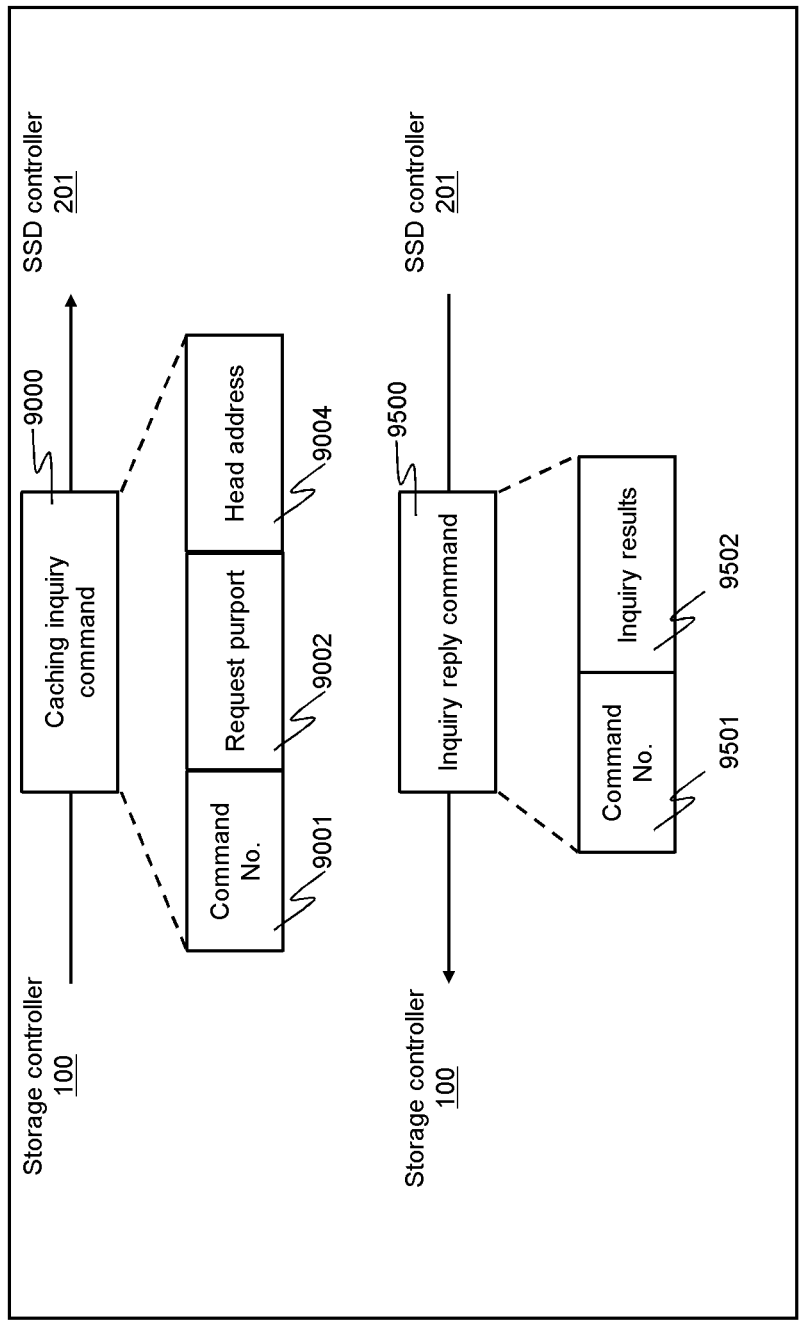
FIG. 25 is a diagram showing an example of a caching inquiry command from the storage controller to the SSD controller and a reply command in reply to the caching inquiry command according to Embodiment 5.

FIG. 25 is a diagram showing an example of a caching inquiry command from the storage controller to the SSD controller and a reply command in reply to the caching inquiry command according to Embodiment 5.

A caching inquiry command 9000 is a command used, for example, for inquiry from the storage controller 100 to the SSD controller 201 about the existence/nonexistence of a cache in the SSD cache. The caching inquiry command 9000 includes fields of command No. 9001, request purport 9002, and head address 9004. In command No. 9001, a command number (No.) for identification of the command is stored. In request purport 9002, a request purport that identifies the inquiry to the SSD cache is stored. In head address 9004, a head address for the data to be cached is stored.

An inquiry reply command 9500 transmitted from the SSD controller 201 to the storage controller 100 as a reply to the caching inquiry command 9000 includes fields of command No. 9501 and inquiry results 9502. In command No. 9501, a command No. corresponding to the caching inquiry command 9000 is stored. In inquiry results 9502, inquiry results are stored. The inquiry results include no hit in the SSD cache, the size of the data hit in the SSD cache, and so forth.

Figure 26:
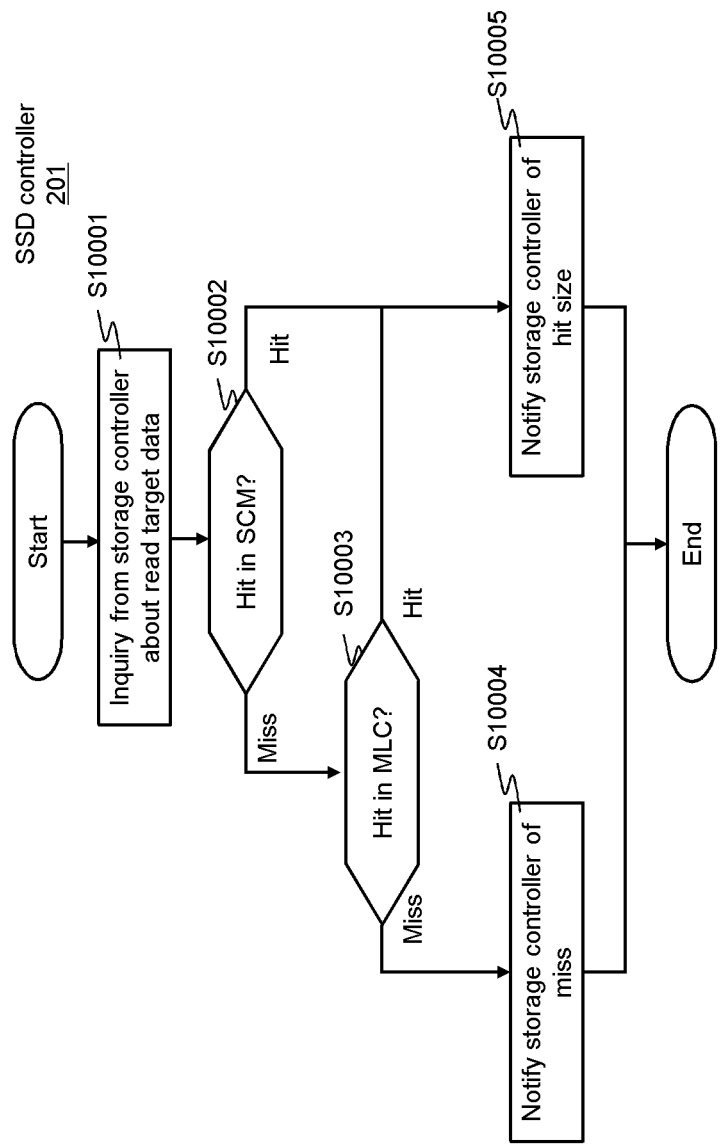
FIG. 26 is a flowchart of an inquiry meeting process according to Embodiment 5.

FIG. 26 is a flowchart of an inquiry meeting process according to Embodiment 5.

The inquiry meeting process is a process executed when the SSD controller 201 receives the caching inquiry command 9000 transmitted from the storage controller 100.

The SSD controller 201 receives the caching inquiry command 9000 from the storage controller 100 (S10001) and makes hit/miss determination on the SCM chip 2011 and the MLC FM chip 2012 with respect to the data corresponding to the inquiry by referring to the SSD cache management table 2000 (S10002, S10003).

In the case of a hit in the SCM chip 2011 or the MLC FM chip 2012 (S10002: Hit, S10003: Hit), the SSD controller 201 notifies the storage controller 100 of information including the hit size of the hit data (S10005) and ends the inquiry meeting process. On the other hand, in the case of no hit in each of the SCM chip 2011 and the MLC FM chip 2012 (S10002: Miss and S10003: Miss), the SSD controller 201 notifies the storage controller 100 of a miss in the cache (S10004) and ends the inquiry meeting process. Thus, the storage controller 100 can be notified of the results of hit/miss determination in the SSD cache.

A process performed when a write request is received from the host computer 40 in the storage system according to Embodiment 5 will be described.

The process performed when a write request is received from the host computer 40 in the storage system according to Embodiment 5 is generally the same as the write process (see FIG. 5) and the process of destaging from the DRAM cache (see FIG. 6) according to Embodiment 1. However, when hit/miss determination on the SSD cache is required, the storage controller 100 inquires of the SSD controller 201. For example, in processing in step S70 shown in FIG. 5, the storage controller 100 issues an inquiry to the SSD controller 201 about hit/miss determination. The SSD controller 201 receives the inquiry and makes hit/miss determination with respect to the target data by referring to the SSD cache management table 2000 and notifies the storage controller 100 of the results of the determination (the inquiry meeting process shown in FIG. 26). In the event of a hit in the SSD cache (S70: Hit), the SSD controller 201 invalidates the hit data in the SSD cache while notifying the results.

In the storage system according to Embodiment 5, the storage controller 100 issues the caching request command 3000 to the SSD controller 201 in step S44 shown in FIG. 6, and the SSD controller 201 receiving the caching request command 3000 executes the subsequent process shown in FIG. 7 by using the SSD cache management table 2000.

In Embodiment 5, processing for a writeback request (S4414) and data moving processing (S4416) shown in FIG. 10 are the same as those in Embodiment 1.

In the caching request meeting process in the storage system according to Embodiment 5, the SSD controller 201 secures a free space in the SSD cache and thereafter selects a storage place for the data to be cached in the SSD cache according to the request by predicting an update frequency from the cache status 3003 in the caching request command 3000 (S4423), as in the case of the caching request meeting process according to Embodiment 1 shown in FIG. 14.

The process of storing in the SCM chip 2011 by the SSD controller 201 (S4426) is basically the same as that in the storage system according to Embodiment 1 shown in FIG. 15. The SSD controller 201 executes processing for checking the existence/nonexistence of a free space in the SCM chip 2011 (S44261) by referring to the SSD cache management table 2000. Also, by using the SSD cache management table 2000, the SSD controller 201 performs the process steps in the process of destaging from the SCM shown in FIG. 16, corresponding to processing for destaging from the SCM chip 2011 (S44262).

A process performed when a read request is received from the host computer 40 in the storage system according to Embodiment 5 will be described.

When receiving a read request from the host computer 40, the storage controller 100 executes the read process shown in FIG. 17. In the storage system according to Embodiment 5, the storage controller 100 issues an inquiry about hit/miss determination with respect to the read target data to the SSD controller 201 in step S100, as it does at the time of writing.

The storage controller 100 obtains the results of hit/miss determination from the SSD controller 201 and issues a read request to the SSD controller 201 (S120) if the determination results indicate a hit in the SSD cache (S100: Hit). When receiving the read request from the storage controller 100 (S121 in FIG. 18), the SSD controller 201 performs the read process shown in FIG. 18 and transfers the read data to the storage controller 100.

In the storage system according to Embodiment 5, part of the cache management table 1000 (information about the SSD cache) is controlled by the hybrid SSD 200, so that the storage controller 100 may only manage the cache in the DRAM, thus reducing the load on the storage controller 100.

Several embodiments of the present invention have been described. However, the present invention is not limited to the described embodiments. Needless to say, various changes and modifications of the embodiments can be made without departing from the gist of the invention.

For example, the hybrid SSD 200, the SSDs 220 and 230 or the like used as a secondary cache are provided outside the storage controller 100 in the above-described embodiments. However, the present invention is not limited to this. For example, the hybrid SSD 200, the SSDs 220 and 230 or the like used as a secondary cache may be provided in the storage controller 100.

Reference Signs List

10: Storage apparatus, 100: Storage controller, 200: Hybrid SSD, 40: Host computer

The invention claimed is:

1. A cache control apparatus comprising:
a primary cache part;
a secondary cache part configured to cache data destaged from the primary cache part; and
a controller connected to the primary cache part and to the secondary cache part,
wherein the secondary cache part includes a first storage part and a second storage part having a lifetime longer than that of the first storage part; and
the controller is configured to determine whether the data destaged from the primary cache part is to be stored in the first storage part or the second storage part in the secondary cache part, based on a use state indicating whether the data has been updated, and
to store the data in the first storage part or the second storage part determined;
the controller is configured to determine whether a read count of the data is equal to or larger than a predetermined threshold when the data is destaged from the second storage part in the secondary cache part;
the controller is configured to migrate the data in the second storage part into the first storage part when the read count is equal to or larger than the predetermined threshold, and to invalidate the data in the second storage part when the read count is smaller than the threshold; and the controller is configured to merge data read from the first storage part and data read from the second storage part and to transfer the merged data to a place from which a read request is received, when the data to be read according to the read request has been stored by being distributed to the first storage part and the second storage part in the secondary cache part.

2. The cache control apparatus according to claim 1, wherein the controller is configured to store the data in a storage device that is a storage place for the data when the data is not stored in the storage device when the data is destaged from the second storage part in the secondary cache part.

3. The cache control apparatus according to claim 1, wherein the controller is configured to store the data destaged in a predetermined storage device without storing the data in the secondary cache part when the data is sequential data and/or when the amount of the data is equal to or larger than a predetermined amount.

4. The cache control apparatus according to claim 1, wherein the controller is configured to obtain from a higher-level apparatus use state information indicating the use state of the data destaged, and to determine, based on the use state information, whether the data destaged from the primary cache part is to be stored in the first storage part or the second storage part in the secondary cache part.

5. The cache control apparatus according to claim 1, wherein the controller includes a first controller and a second controller;
the first controller is configured to transmit the data destaged from the primary cache part and the use state of the data to the second controller; and
the second controller is configured to determine, based on information on the use state, whether the data destaged from the primary cache part is to be stored in the first storage part or the second storage part in the secondary cache part.

6. The cache control apparatus according to claim 1, wherein the first storage part comprises a flash memory of MLC (Multi Level Cell) type, and the second storage part comprises an SCM (Storage Class Memory).

7. The cache control apparatus according to claim 1, wherein the first storage part and the second storage part are constituted by devices of the same kind, and the second storage part has a remaining lifetime longer than that of the first storage part.

8. A cache control method in which a secondary cache part for caching data stored in a primary cache part is provided, and in which caching of the data is controlled, the method comprising:
determining whether the data destaged from the primary cache part is to be stored in a first storage part existing in the secondary cache part or a second storage part having a lifetime longer than that of the first storage part and existing in the secondary cache part, based on a use state indicating whether or not the data has been updated;
storing the data in the first storage part or the second storage part determined;
determining whether a read count of the data is equal to or larger than a predetermined threshold when the data is destaged from the second storage part in the secondary cache part;
moving the data in the second storage part into the first storage part when the read count is equal to or larger than the predetermined threshold and invalidating the data in the second storage part when the read count is smaller than the threshold; and merging data read from the first storage part and data read from the second storage part and transferring the merged data to a place from which a read request is received, when the data to be read according to the read request has been stored by being distributed to the first storage part and the second storage part in the secondary cache part.

9. The cache control method according to claim 8, further comprising reflecting the data in a storage device that is a final storage place for the data when the data is not reflected in the storage device when the data is destaged from the second storage part of the secondary cache part.

10. The cache control method according to claim 8, further comprising storing the data destaged in a predetermined storage device without storing data in the secondary cache part when the data is sequential data and/or if the amount of the data is equal to or larger than a predetermined amount.

11. The cache control method according to claim 8, further comprising obtaining from a higher-level apparatus use state information indicating the use state of the data destaged, and determining, based on the use state information, whether the data destaged from the primary cache part is to be stored in the first storage part or the second storage part in the secondary cache part.

* * * * *